(12) United States Patent
Jackson et al.

(10) Patent No.: US 6,839,972 B2
(45) Date of Patent: Jan. 11, 2005

(54) SELF-CALIBRATING POSITION DETERMINATION SYSTEM

(75) Inventors: David A. Jackson, Point Roberts, WA (US); Brian M. Bliven, San Jose, CA (US); Patrick B. O'Mahony, San Jose, CA (US)

(73) Assignee: Snap-On Incorporated, Pleasant Prairie, WI (US)

( * ) Notice: Subject to any disclaimer, the term of this patent is extended or adjusted under 35 U.S.C. 154(b) by 0 days.

(21) Appl. No.: 10/170,401

(22) Filed: Jun. 14, 2002

(65) Prior Publication Data

US 2002/0189115 A1 Dec. 19, 2002

Related U.S. Application Data

(60) Provisional application No. 60/298,653, filed on Jun. 15, 2001.

(51) Int. Cl.[7] .............................................. G01B 11/275
(52) U.S. Cl. ...................... 33/286; 33/288; 33/203.18; 382/144
(58) Field of Search ..................... 33/286, 288, 203.18, 33/1 CC; 382/144, 154, 153

(56) References Cited

U.S. PATENT DOCUMENTS

| | | | | |
|---|---|---|---|---|
| 3,790,277 A | * | 2/1974 | Hogan | 356/139.06 |
| 4,396,945 A | | 8/1983 | DiMatteo et al. | |
| 4,519,705 A | * | 5/1985 | Morrow | 33/DIG. 21 |
| 4,753,569 A | * | 6/1988 | Pryor | 700/250 |
| 5,046,032 A | * | 9/1991 | Alusick et al. | 33/288 |
| 5,274,433 A | * | 12/1993 | Madey et al. | 33/288 |
| 5,531,030 A | * | 7/1996 | Dale, Jr. | 33/203.18 |
| 5,535,522 A | | 7/1996 | Jackson | |
| 5,675,515 A | | 10/1997 | January | |

(List continued on next page.)

FOREIGN PATENT DOCUMENTS

| | | |
|---|---|---|
| DE | 29 48 573 A1 | 6/1981 |
| EP | 0149690 | 1/1984 |
| EP | 0948760 B1 | 7/2002 |
| WO | WO99/22281 | 5/1999 |
| WO | WO00/16121 | 3/2000 |

OTHER PUBLICATIONS

Hunter Engineering Co. Product Literature "DSP400 Alignment Sensors", Form No. 4240T, Jan., 1999.
Select pages from Hunter Engineering Co. Product Literature "Installation Instructions—DSP400 Sensors", Form No. 4345T, Jun., 1999.

*Primary Examiner*—Diego Gutierrez
*Assistant Examiner*—Madeline Gonzalez
(74) *Attorney, Agent, or Firm*—McDermott Will & Emery LLP

(57) ABSTRACT

A position determination system comprises a first measuring apparatus and a second measuring apparatus. The first measuring apparatus includes a first sensing device having a sensing field for obtaining positional data of a first testing target, a calibration target rigidly linked to the first sensing device, wherein the positional relationship between the first sensing device and the calibration target is known. The system has a repositioning mechanism for repositioning the sensing field of the first sensing device. The second measuring apparatus includes a second sensing device having a sensing field for obtaining positional data of a second testing target, a calibration sensing device rigidly linked to the second sensing device for obtaining positional data of the calibration target, wherein the positional relationship between the second sensing device and the calibration sensing device is known, and a repositioning mechanism for repositioning the sensing field of the second sensing device. Depending on different needs, the repositioning mechanism readjust the viewing fields of the sensing devices such that the testing targets are properly within the sensing fields of the sensing devices.

33 Claims, 25 Drawing Sheets

U.S. PATENT DOCUMENTS

| | | | |
|---|---|---|---|
| 5,724,128 A | * 3/1998 | January | 33/203.18 |
| 5,724,129 A | * 3/1998 | Matteucci | 33/203.18 |
| 5,724,743 A | * 3/1998 | Jackson | 33/288 |
| 5,809,658 A | * 9/1998 | Jackson et al. | 33/288 |
| 5,870,315 A | 2/1999 | January | |
| 6,064,750 A | * 5/2000 | January et al. | 33/203.18 |
| 6,101,455 A | * 8/2000 | Davis | 702/94 |
| 6,151,787 A | * 11/2000 | Wright et al. | 33/286 |
| 6,298,284 B1 | 10/2001 | Burns, Jr. et al. | |
| 6,424,411 B1 | 7/2002 | Rapidel et al. | |
| 6,498,959 B1 | * 12/2002 | January et al. | 33/288 |
| 6,594,600 B1 | 7/2003 | Arnoul et al. | |
| 2002/0080343 A1 | 6/2002 | Bux et al. | |

* cited by examiner

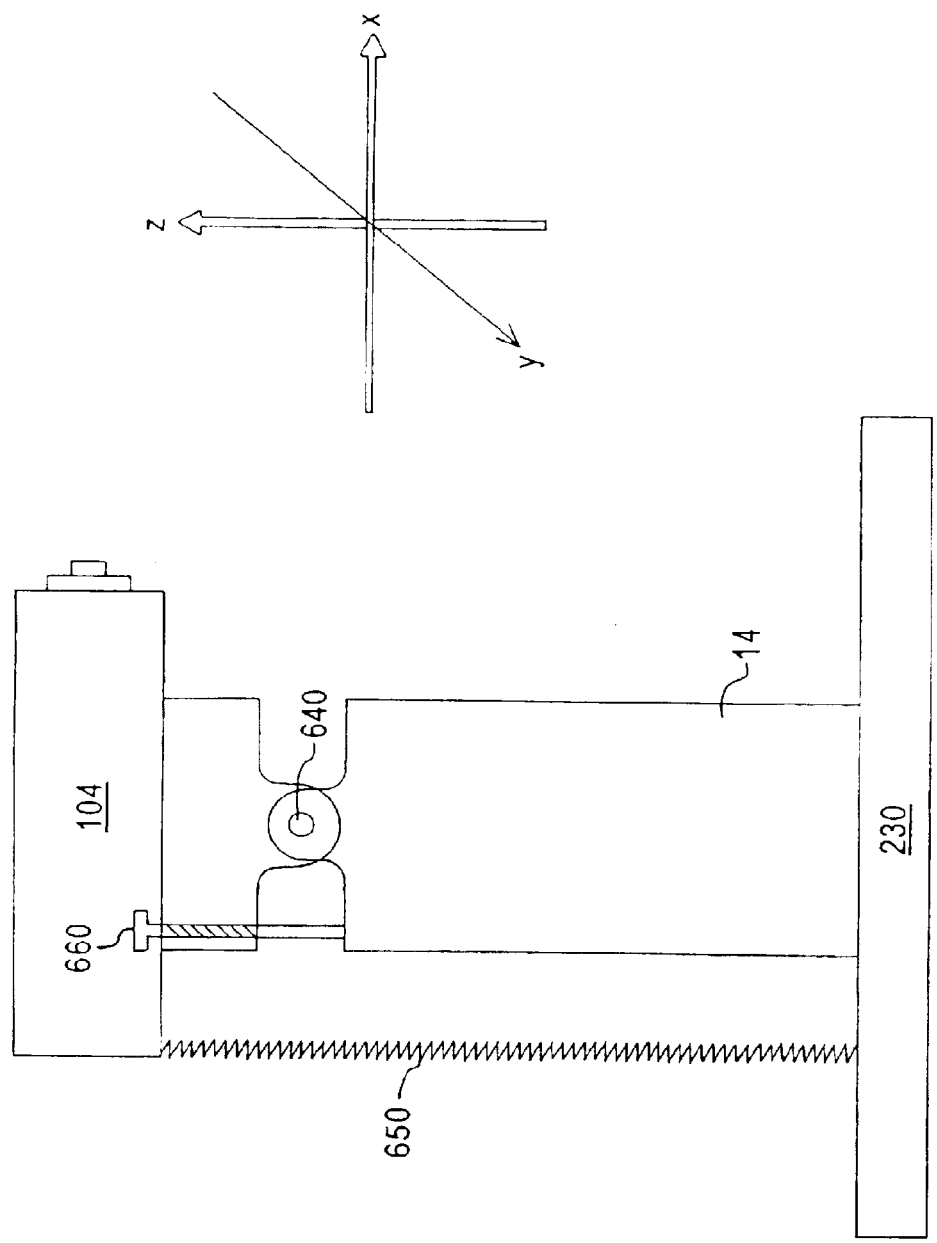

SELF-CALIBRATING POSITION DETERMINATION SYSTEM

RELATED APPLICATION

The present application claims the benefit of priority from U.S. Provisional Patent Application Ser. No. 60/298,653, entitled "APPARATUS, SYSTEM, METHOD AND USER INTERFACE FOR ADJUSTING THE YAW OF A SELF-CALIBRATING THREE-DIMENSIONAL ALIGNER," filed Jun. 15, 2001.

FIELD OF THE DISCLOSURE

The disclosure generally relates to a position determination method and system, and more specifically, to a method and system for adjusting a self-calibrating position determination system to adapt to different needs.

BACKGROUND OF THE DISCLOSURE

Position determination systems, such as a machine vision measuring system, are used in many applications. For example, wheels of motor vehicles may be aligned using a computer-aided, three-dimensional machine vision alignment apparatus and a related alignment method. Examples of 3D alignment are described in U.S. Pat. No. 5,724,743, titled "Method and apparatus for determining the alignment of motor vehicle wheels," and U.S. Pat. No. 5,535,522, titled "Method and apparatus for determining the alignment of motor vehicle wheels," both of which are commonly assigned to the assignee of the present disclosure and incorporated herein for reference.

To determine the alignment status of the vehicle wheels, some aligners use directional sensors, such as cameras, to view alignment targets affixed to the wheels to determine the position of the alignment targets relative to the alignment cameras. These types of aligners require a calibration process to determine the relative positions between the alignment cameras in order to accurately determine the position between the wheels on one side of the vehicle and the wheels on the other side of the vehicle.

According to one calibration method, a large alignment target is positioned in the field of view of the alignment cameras, typically along the centerline of the alignment rack, and away from the alignment cameras. Since each alignment camera views the same alignment target, the alignment target's position relative to each alignment camera can be calculated and the positional relationship between the alignment cameras can be determined. This is called a relative alignment camera position (RCP) calibration. A RCP transfer function is used to convert one alignment camera's coordinate system into the other alignment camera's coordinate system so that an alignment target viewed by one alignment camera can be directly related to a alignment target viewed by the other alignment camera. One approach for performing an RCP is disclosed in U.S. Pat. No. 5,809,658, entitled "Method and Apparatus for Calibrating Alignment cameras Used in the Alignment of Motor Vehicle Wheels," issued to Jackson et al. on Sep. 22, 1998, which is incorporated herein by reference.

While RCP calibration is accurate, it requires special fixtures and a trained operator to perform. Thus, there is a need for a simpler calibration process for calibrating a position determination system. Approaches for self-calibrations have been proposed in a co-pending patent application entitled "Self-Calibrating, Multi-Alignment camera Machine Vision Measuring System," by Jackson et al., Ser. No. 09/576,442, filed on May 22, 2000, and a co-pending patent application entitled "Self-Calibrating 3D Machine Vision Measuring System Useful In Motor Vehicle Wheel Alignment," by Jackson et al., Ser. No. 09/928,453, filed Aug. 14, 2002, both of which are commonly assigned to the assignee of the present application, and are incorporated herein by reference.

These approaches, however, do not resolve a problem encountered by position determination systems. After a position determination system, such as a machine vision measuring system, is installed and calibrated, the system usually can work with only certain sizes of objects under test. For example, a 3D aligner uses alignment cameras to view alignment targets affixed to the wheels. As the alignment cameras have limited fields of view, the system can determine alignment target positions only for vehicles with specific sizes. If a vehicle is wider or narrower than the specific sizes, the targets will fall outside the cameras' fields of view and the aligner cannot measure the positions of alignment targets without moving the aligner to a new position where that the alignment targets can be properly seen by the alignment cameras. The removal and reinstallation of the aligner is troublesome and consumes time. In addition, after the aligner is reinstalled, it takes time to aim the cameras towards the alignment targets.

Thus, there is a need for a position determination system that is adapted to different sizes of objects under test without the need to reinstall the system.

There is another need for an automatic system having sensing devices that can locate the alignment targets automatically without human intervention.

There is still another need for a user interface to indicate the positions of the sensing devices and whether the alignment targets are properly within the sensing field of the sending devices.

SUMMARY OF DISCLOSURE

The disclosure describes a position determination method and system that addresses the foregoing needs as well as other needs. The position determination system includes a data processing system, a first measurement module, and a second measurement module. The first measurement module includes a first measuring device for use with a first testing target to generate positional data of the first alignment target device relative to the first measuring device. The first measuring module has a calibration target having a known positional relationship relative to the first measuring device. The first measuring device can be adjusted such that the first testing target device falls within a specific measuring field of the first measuring device.

The second measurement module includes a second measuring device for use with a second testing target device to generate positional data of the second testing target device relative to the second measuring device. The second measurement module has a calibration measuring device for use with the calibration target to generate positional data of the calibration target relative to the calibration measuring device. The positional relationship between the second measuring device and the calibration measuring device is known. The second measuring device such that the second testing target device is within a specific measuring field of the second measuring device.

The measuring devices and the targets are used to generate positional data relating to the relative position between the measuring devices and the targets. In one aspect, the measuring devices may be any directional sensors that can sense signals from the testing targets, such as machine vision devices for sensing the images of the testing targets, or light sensors with limited sensing fields for sensing lights from a specific direction. Examples of machine vision devices are cameras or video cameras or the like. The testing/calibration targets may be specific patterns of images to be captured by machine vision devices. Optionally, the testing/calibration targets may be active light sources, such as LEDs.

In one aspect, a repositioning mechanism is provided to adjust the measuring devices such that the alignment targets fall within the sensing field of the measuring devices. For example, a motor may be provided to rotate a camera relative to an axis so that the lens of the camera aims at a new direction. Alternatively, the camera may be slidely attached to a horizontal rail such that the camera may be moved along the rail and the lens of the camera can aim at a new point.

A method for calibrating the position determination system is also disclosed. The method determines if the first testing target is within a specific sensing field of the first measuring device, and if the second testing target is within a specific sensing field of the second measuring device. Responsive to the first testing target failing to be within the first specific sensing field of the first measuring device, the sensing field of the first measuring device is repositioned until the first testing target is within the specific sensing field of the first measuring device. If the second testing target fails to be within the specific sensing field of the second measuring device, the sensing field of the second measuring device is repositioned until the second testing target is within the specific sensing field of the second measuring device. Signals representing positional data of the calibration target relative to the calibration measuring device are received. The positional relationship of the first measuring device relative to the second measuring device is then determined based on the positional relationship between the first measuring device and the calibration target, the positional relationship between the second measuring device and the calibration sensing device, and the positional data of the calibration target relative to the calibration measuring device.

A positional parameter of the first testing target and a positional parameter of the second testing target are generated based on the positional relationship between the first measuring device and the calibration target, the positional relationship between the second measuring device and the calibration measuring device, the positional data of the first testing target relative to the first measuring device, the positional data of the second testing target relative to the second measuring device, and the positional data of the calibration target relative to the calibration measuring device.

A method for locating the testing targets is also provided for use with the position determination system. The method determines whether the first testing target is within a specific sensing field of the first measuring device, and whether the second testing target is within a specific sensing field of the second measuring device. Responsive to any of the testing targets failing to be within the specific sensing field of the measuring device, the sensing field of the measuring device is continuously adjusted until the testing target properly falls in the specific sensing field of the measuring device.

The data processing system includes a user interface to indicate whether the testing targets are properly within the sensing fields of the measuring device. If any of the testing targets fails to be within the specific sensing field of the measuring devices, a visual indication is provided to indicate as such. For example, a warning message can be generated on a display to inform an operator to make proper adjustment. Or, graphic representation of the status may be provided on the display.

BRIEF DESCRIPTION OF THE DRAWINGS

The present disclosure is illustrated by way of example, and not by way of limitation, in the figures of the accompanying drawings and in which like reference numerals refer to similar elements and in which:

FIG. 7E is another variation of the repositioning mechanism.

DETAILED DESCRIPTION OF ILLUSTRATIVE EMBODIMENTS

In the following description, for the purposes of explanation, numerous specific details are set forth in order to provide a thorough understanding of the present disclosure. It will be apparent, however, to one skilled in the art that the present disclosure may be practiced without these specific details. In other instances, well-known structures and devices are shown in block diagram form in order to avoid unnecessarily obscuring the present disclosure.

System Overview

A computer-aided wheel alignment system ("aligner") upon which an exemplary position determination system may be implemented is described. The aligner includes alignment cameras for capturing images and generating positional data of alignment targets affixed to a vehicle under test, a data processing system for processing the positional data and determining the positions of the alignment targets, and a repositioning mechanism configured to reposition the viewing fields of the alignment cameras. Depending on the size of vehicles under alignment process, the repositioning mechanism adjusts the viewing fields of the alignment cameras to a position at which the alignment targets can be properly seen by the alignment cameras without the need to remove and/or reinstall the aligner.

Figure 1A:
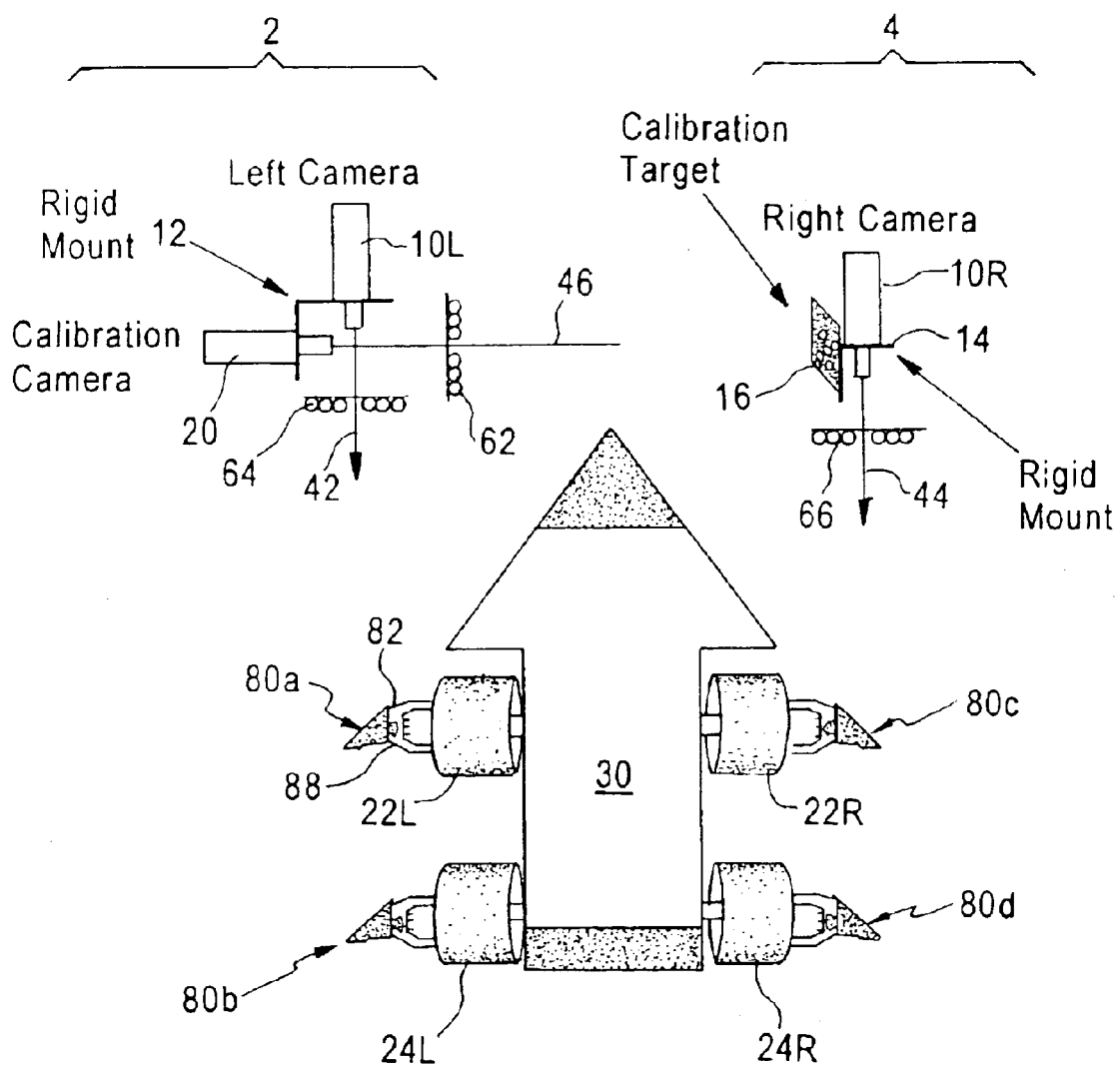
FIG. 1A is a schematic top plan view of an exemplary position determination system.

FIG. 1A is a schematic top plan view of the aligner. The aligner has a left measurement module 2 and a right measurement module 4. Arrow 30 schematically represents a motor vehicle undergoing alignment. The vehicle includes left and right front wheels 22L, 22R and left and right rear wheels 24L, 24R. An alignment target 80a, 80b, 80c, 80d is secured to each of the wheels 22L, 22R, 24L, 24R, respectively. Each alignment target generally comprises a plate 82 on which alignment target information is imprinted and a clamping mechanism 88 for securing the alignment target to a wheel. The terms "left" and "right" are for illustration purpose only, and are not intended to require a particular element to be located in a particular location or relationship with respect to another element.

The left measurement module 2 comprises a left alignment camera 10L and a calibration camera 20. Left alignment camera 10L faces the vehicle and views the left side alignment targets 80a, 80b along axis 42. Alignment camera 10L is rigidly mounted to left rigid mount 12.

The calibration camera 20 faces the right measurement module 4 and views a calibration target 160 along axis 46. The calibration camera 20 also is affixed rigidly to mount 12. In one embodiment, axis 42 and axis 46 subtend an angle of about 90 degrees; however, this particular angular relationship is not required or necessary.

Right measurement module 4 comprises a right alignment camera 10R that generally faces the vehicle and views the right side alignment targets 80c, 80d along axis 44. Right alignment camera 10R is affixed to a rigid alignment camera mount 14. Calibration target 160 is rigidly affixed to alignment camera mount 14 in a position visible to calibration camera 20 along axis 46.

Although calibration camera 20 is illustrated as forming a part of left measurement a module 2 and the calibration target 160 as part of right measurement module 4, the positions of the calibration camera 20 and the calibration target 160 can be switched.

Calibration camera 20 and left alignment camera 10L are fixed in pre-determined, known positions. Similarly, right alignment camera 10R and calibration target 160 are fixed in pre-determined, known positions. Thus, the relative position of calibration camera to left alignment camera 10L is known, and the relative position of right alignment camera 10R to calibration target 160 is also known. The relative positions of the two alignment cameras contained in the left measurement module can be obtained by using precision alignment camera mounting hardware. Another approach is to factory calibrate the two-alignment camera positions and store them for later use.

The mounting of left alignment camera 10L and calibration camera 20 to left mount 12 is stable to avoid introduction of calibration errors, which could arise if the alignment cameras move with respect to the mount. Similarly, the mounting of right alignment camera 10R and calibration target 160 to mount 14 is required to be stable.

Optionally, left measurement module 2 and right measurement module 4 may further comprise light sources 62, 64, 66 to illuminate the calibration target 160 and wheel alignment targets 80a–80d. In one embodiment, a first light source 62 is aligned perpendicular to axis 46 to direct light along that axis to illuminate calibration target 160; a second light source 64 is aligned perpendicular to axis 42 to direct light along that axis to illuminate left side wheel alignment targets 80a, 80b; and a third light source 66 is aligned perpendicular to axis 44 to direct light along that axis to illuminate right side wheel alignment targets 80c, 80d. In one embodiment, each of the light sources 62, 64, 66 comprises a circuit board or other substrate on which a plurality of light-emitting diodes (LEDs) are mounted, facing the direction of illumination. However, any other light source may be used.

Figure 1B:
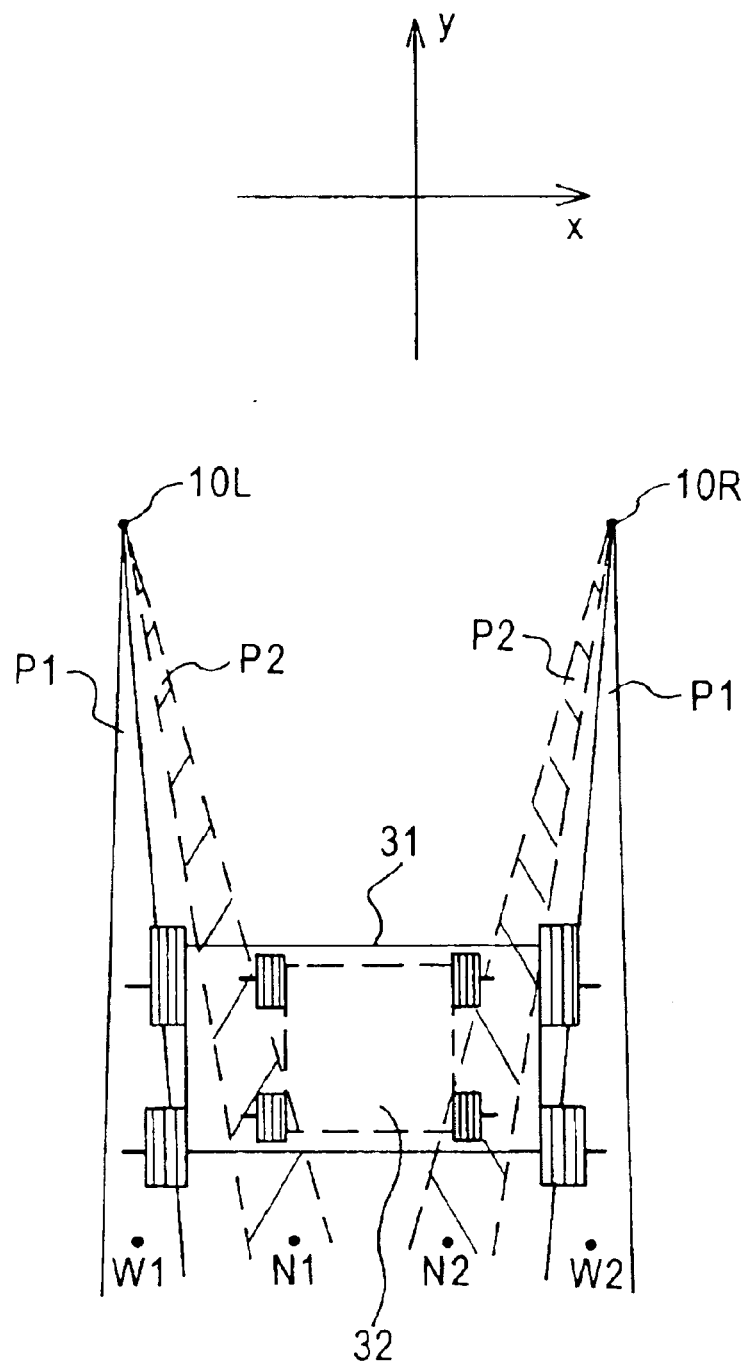
FIG. 1B shows the operation of the exemplary position determination system illustrated in FIG. 1A.

Depending on the different dimensions of vehicles under alignment, the aligner uses a repositioning mechanism to reposition the viewing fields of the alignment cameras 10L, 10R to positions that can properly see the alignment targets without the need to remove and/or reinstall the aligner. FIG. 1B schematically shows the operation of the aligner in different operation modes. A wide vehicle 31 and a narrow vehicle 32 are shown concurrently to illustrate the difference in the vehicle sizes. The aligner may be operated under a wide mode and a narrow mode. When operated under the wide mode, the viewing fields of cameras 10L, 10R are directed to points W1, W2 respectively. When operated under the narrow mode, the viewing fields of cameras 10L, 10R are directed to points N1, N2 respectively.

Viewing fields P1 represent the viewing fields of alignment cameras 10L, 10R positioned in the wide mode to view alignment targets attached to the wheels of the wide vehicle 31; and viewing fields P2 represent the viewing fields of alignment cameras 10L, 10R positioned in the narrow mode to view alignment targets attached to the wheels of the narrow vehicle 32.

As illustrated in FIG. 1B, if the aligner is set to the wide mode, and if a vehicle under alignment is a narrow vehicle 32, the alignment targets attached to the narrow vehicle will be outside the viewing fields P1. In response, the repositioning mechanism may be used to reposition the viewing fields from P1 to P2 so that the alignment targets fall in the viewing fields of the alignment cameras.

Conversely, if the aligner is set to the narrow mode, if a vehicle under alignment is a wide vehicle 31, the alignment targets attached to the wide vehicle will be outside the viewing fields P2. Correspondingly, the repositioning mechanism may be used to reposition the viewing fields from P2 to P1 so that the alignment targets fall in the viewing fields of the alignment cameras.

Although the above example uses alignment cameras for purpose of illustration, the repositioning operation can be applied to other sensing devices having directional sensing fields or signal sources with directional signal emitting path. For example, the sensing devices may be directional light sensors that sense light from active alignment targets with light sources, such as LEDs. Each light sensor has a limited sensing field for sensing light from a specific direction. In another embodiment, the measurement module may include a light source with LEDs and the alignment targets may include directional light sensors. The sensors on the alignment targets generate positional signals of the light source. Measurements of the relative positions between the measurement modules and the wheels to which the alignment targets attach can be calculated based on the positional signals obtained by the alignment targets.

Figure 1C:
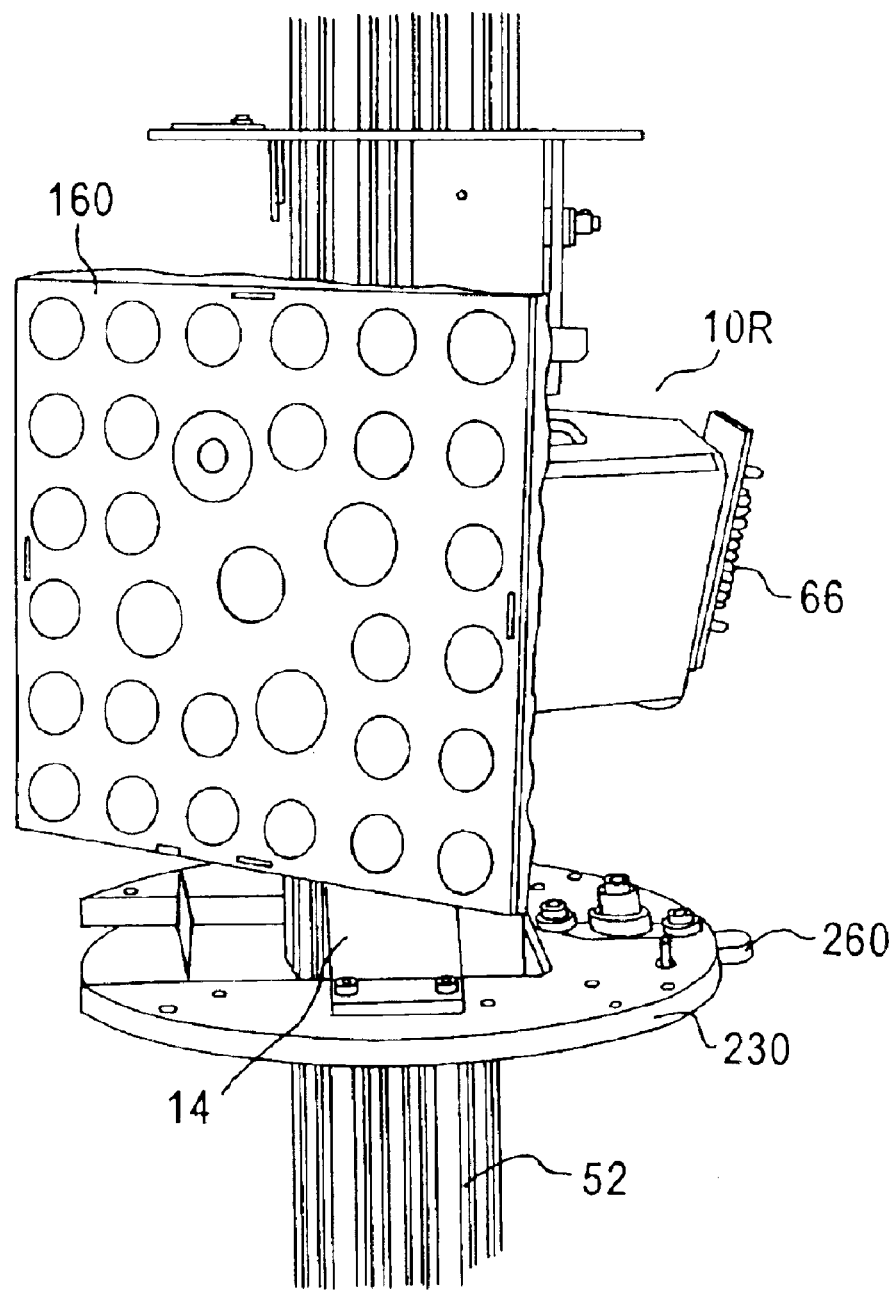
FIG. 1C shows a partial structure of an exemplary measurement module.

FIG. 1C shows a partial structure of the right measurement module 4. The right measurement module 4 includes an upright 52 to elevate the right alignment camera 10R and the calibration target 160 to a proper height so that the alignment targets attached to the subject under test can be properly seen by the alignment camera. The upright 52 may be a rigid post affixed to an alignment rack or to the floor of a service facility.

The right alignment camera 10R and the calibration target 160 are affixed to a rigid mount 14. The rigid mount 14 is attached to a rotation plate 230. The rotation plate 230 has a hole allowing the upright 52 to pass through. A lever 260 is used to rotate the rotation plate 230 relative to the center of the upright 52. A lever 260 is used to rotate the rotation plate 230 relative to the center of the upright 52. Since the right alignment camera 10R and the calibration target 160 are rigidly attached the rotation plate 230 through the rigid mount 14, the right alignment camera 10R and the calibration target 160 rotate around the center of the upright 52 as the rotation plate 230 rotates around the center of the upright 52.

The left measurement module 2 has a structure similar to the right measurement module 4, except that the left measurement module 2 has a calibration camera 20 instead of a calibration target 160. The left measurement module 2 uses the calibration camera 20 to view the calibration target 160. The relative position between the calibration camera 20 and the calibration target 160 is determined based on the images of the calibration target 160 captured by the calibration camera 20.

Calibration of Measurement Modules

As indicated in FIG. 1A, measurement modules 2 and 4 have been placed in front of the vehicle to be aligned. The left measurement module 2 is oriented so that left alignment camera 10L can view the left side of the vehicle and the calibration camera 20 can view the calibration target 160 of the right measurement module 4. The right measurement module 4 has been positioned so that the right alignment camera 10R can view the right side of the vehicle and so that the calibration target 160 is visible to calibration camera 20, as in FIG. 1. Before the aligner can be used, the relative positions of the components of each of the measurement modules must be determined.

In one embodiment, elements (e.g., alignment camera, calibration camera, and calibration target) in the measurement modules are manufactured and calibrated in such a way that, once manufactured, there is not any variations in the relative positions of these elements in each alignment measurement module. Relative positions of two measurement modules are then measured, completing the calibration process for the aligner.

In another embodiment, relative positions of elements in each measurement module are calibrated at the time the aligner is manufactured, and the calibration data for these elements are saved for later use in calibrating the measurement modules. Further, calibration of the measurement modules is achieved at the service station where wheel alignments are performed. Because the relative positions of alignment cameras, calibration camera, and calibration targets in the measurement modules are calibrated, all alignment cameras are calibrated when the position of left measurement module relative to right measurement module is measured. In these conditions, the aligner is said to have been fully calibrated, and is ready for use in wheel alignments.

In one embodiment, left calibration camera 20 is used to measure the position of left calibration camera 20 relative to right calibration target 160. Measurement of the position of left calibration camera 20 relative to right calibration target 160 yields the position of left measurement module 2 relative to right measurement module 4 because the calibration camera is affixed to the left measurement module 2, and calibration target 160 is affixed to right measurement module 4.

In still another embodiment, calibration camera 20 is configured to periodically calibrate the position of left measurement module 2 relative to right measurement module 4. The time interval for calibrating the aligner varies, which could be several times per second, or one per day, or one per week, etc.

Detailed approaches for conducting calibrations are described in a co-pending patent application entitled "Self-Calibrating, Multi-Alignment camera Machine Vision Measuring System," by Jackson et al., Ser. No. 09/576,442, filed on May 22, 2000, and a co-pending patent application entitled "Self-Calibrating 3D Machine Vision Measuring System Useful In Motor Vehicle Wheel Alignment," by Jackson et al., Ser. No. 09/928,453, filed Aug. 14, 2002, both of which are commonly assigned to the assignee of the present application, and are incorporated herein by reference.

The Repositioning Mechanism

Figure 2:
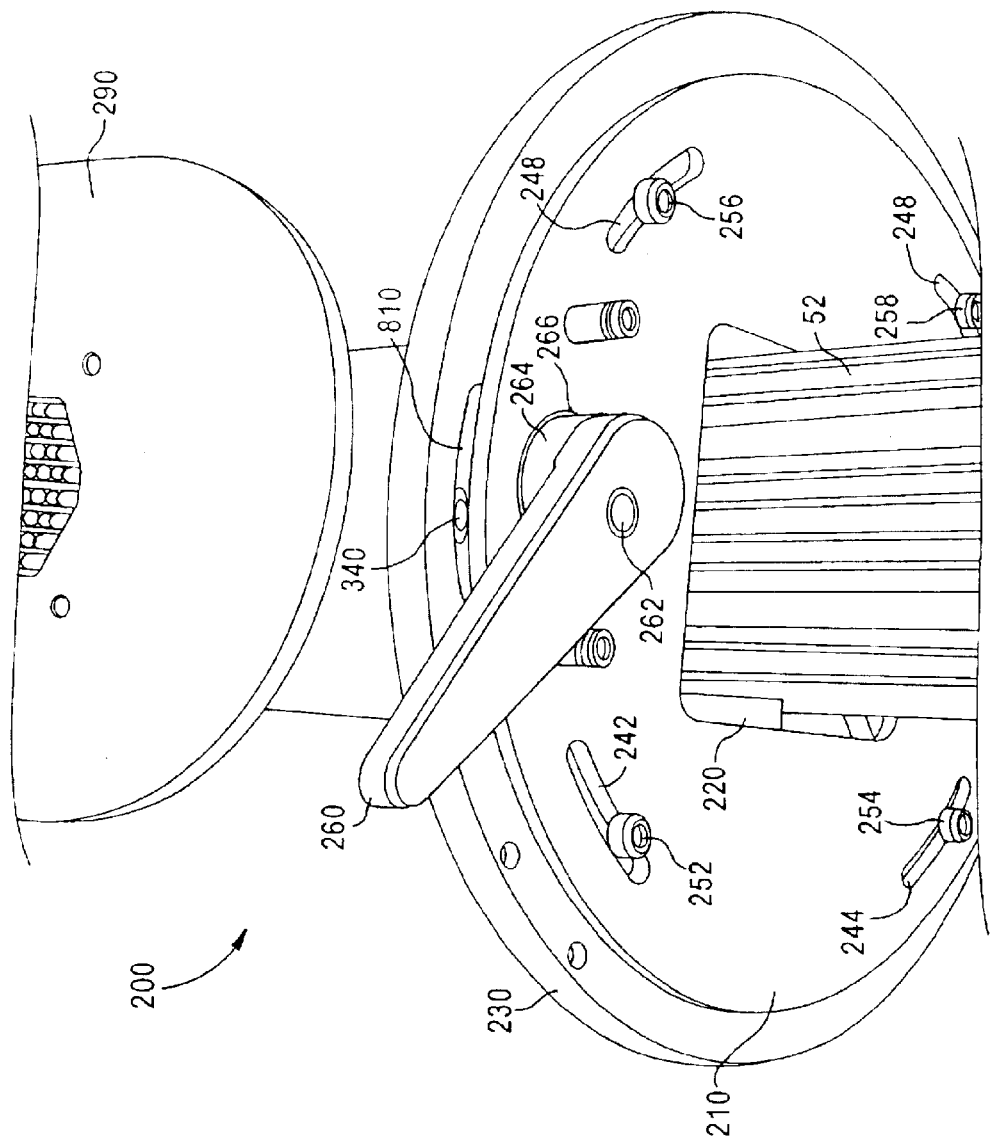
FIG. 2 shows the bottom view of an exemplary measurement module with a repositioning mechanism.

As indicated above, the aligner has a repositioning mechanism for repositioning the viewing fields of the alignment cameras to accommodate vehicles with different sizes without removing or reinstalling the measurement modules. FIG. 2 shows a bottom view of a measurement module 200 with an exemplary repositioning mechanism that can move or turn the alignment cameras such that the viewing fields of the alignment cameras may be repositioned along the x-y plane, as illustrated in FIG. 1B.

The measurement module 200 has a rotation plate 230. An alignment camera 290 is rigidly attached to the rotation plate 230 along with a calibration target or a calibration camera. The rotation plate 230 has a hole allowing the upright 52 to pass through. A supporting plate 210 is a fixed car with sliders that is capable of sliding up and down along the upright 52. The supporting plate 210 has four slots 242, 244, 246 and 248. The rotation plate 230 is attached to the supporting plate 210 via pins 252, 254, 256 and 258 disposed inside the slots and is capable to slide along the slots.

A lever 260 is used to rotate the rotation plate 230 relative to the center of the upright 52. The lever 260 is rotatably attached to the rotation plate 230 and the supporting plate 210 via a pivot shaft 262. An offset disk 264 is disposed around the pivot shaft 262 and between the supporting plate 210 and the lever 260.

Figure 3A:
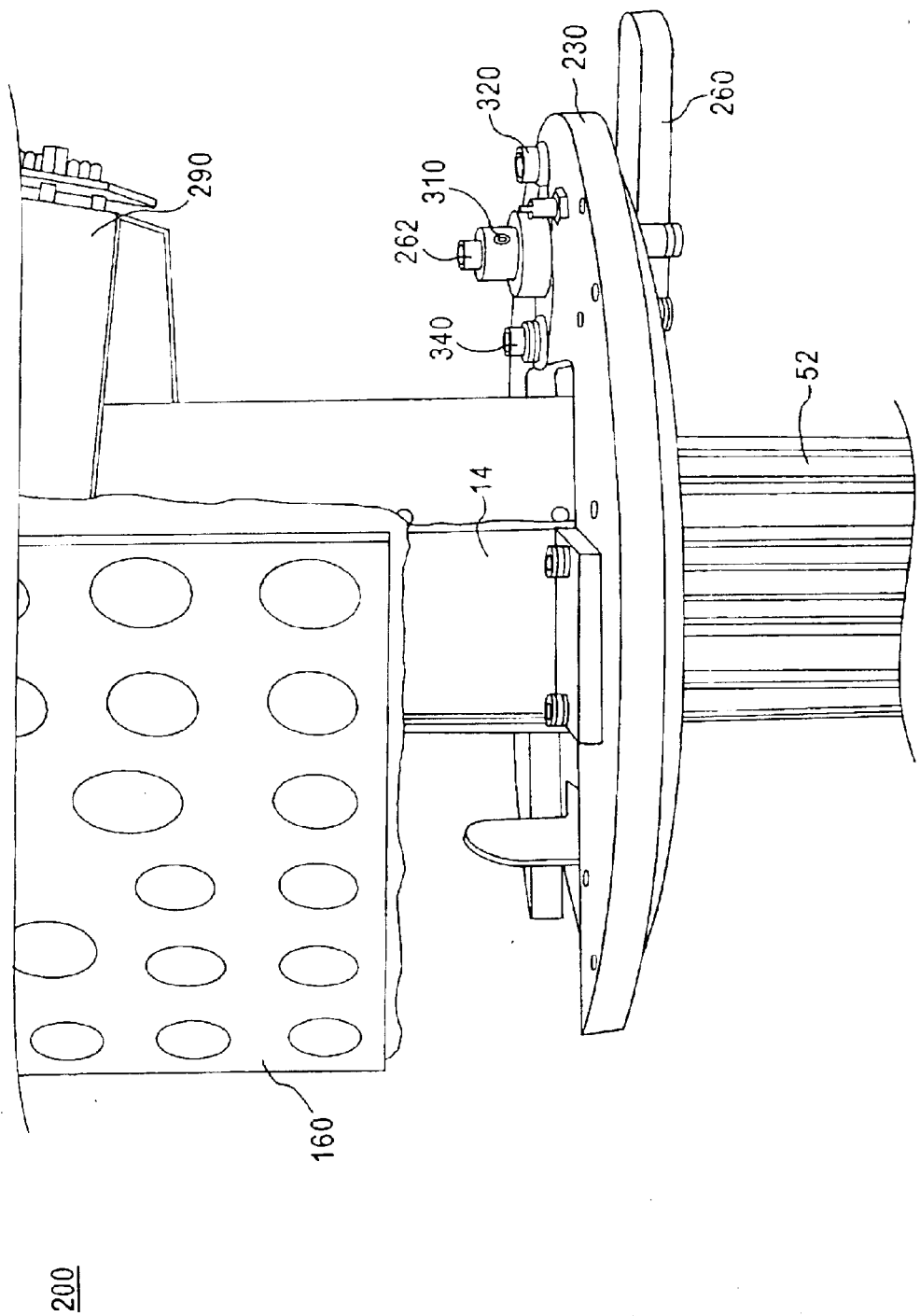
FIG. 3A is a perspective view of an exemplary measurement module.

FIG. 3A shows a perspective view of the measurement module 200 with alignment camera 290 and a calibration target 160. The alignment camera 290 and the calibration target 160 are attached to the rotation plate 230 via a rigid mount 14. The lever 260 is attached to the rotation plate 230 with the pivot shaft 262 and a bearing 310.

Figure 3B:
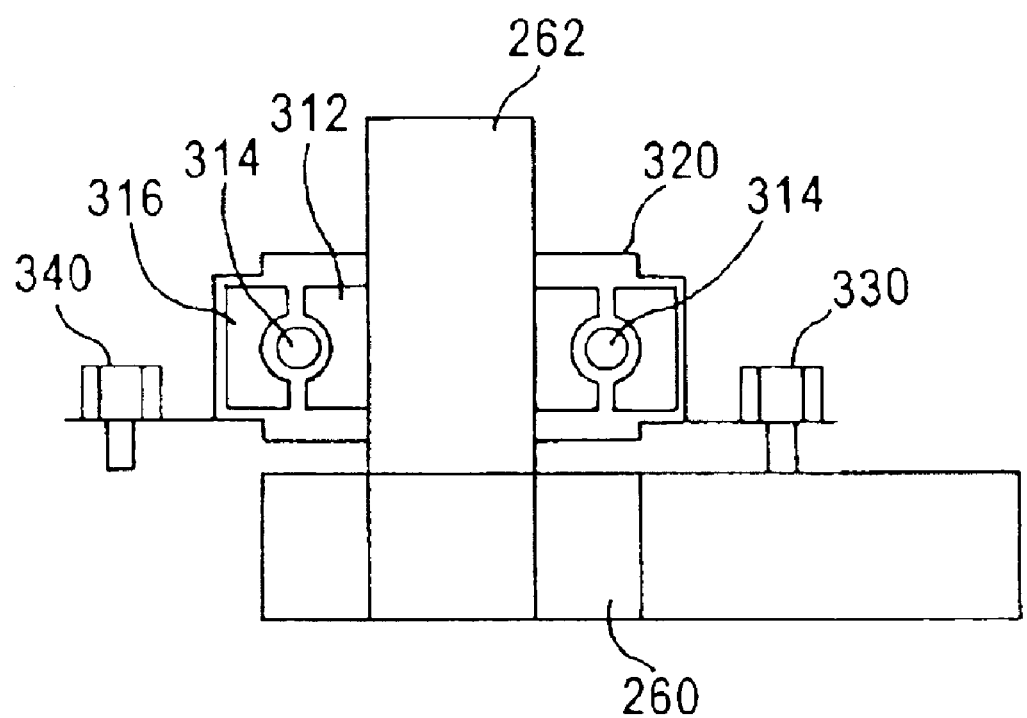
FIG. 3B shows an exemplary repositioning mechanism.

FIG. 3B shows the detailed structure of the lever 230, bearing 310 and housing 320. The bearing 230 allows the lever 230 to actuate rotation of the rotation plate 230. The pivot shaft 262 penetrates the bearing 310. The bearing 310 is affixed to the rotation plate 230 via two screws 320, 340. The bearing 310 has numerous small balls 314 and an inner raceway 312 and outer raceway 316 inside the bearing. The inner raceway 312 is pressed into the pivot shaft 262. When the lever 260 is turned, the bearing 310 enables the pivot shaft 262 to rotate, and the non-concentric offset disk 264 supplies a force on the rotation plate 230 such that rotation of the lever 260 translates to the rotation of the rotation plate 230. Since the alignment cameras/calibration camera/ calibration target are rigidly attached to the rotation plate, the alignment cameras/calibration camera/calibration target rotate along with the rotation of the rotation plate 230. The viewing field of the alignment camera rotates when the alignment camera rotates. Thus, as illustrated in FIG. 1B, the viewing field can be positioned from P1 to P2, or P2 to P1 simply by rotating the rotation plate 230 via the lever 260.

Figure 4A:
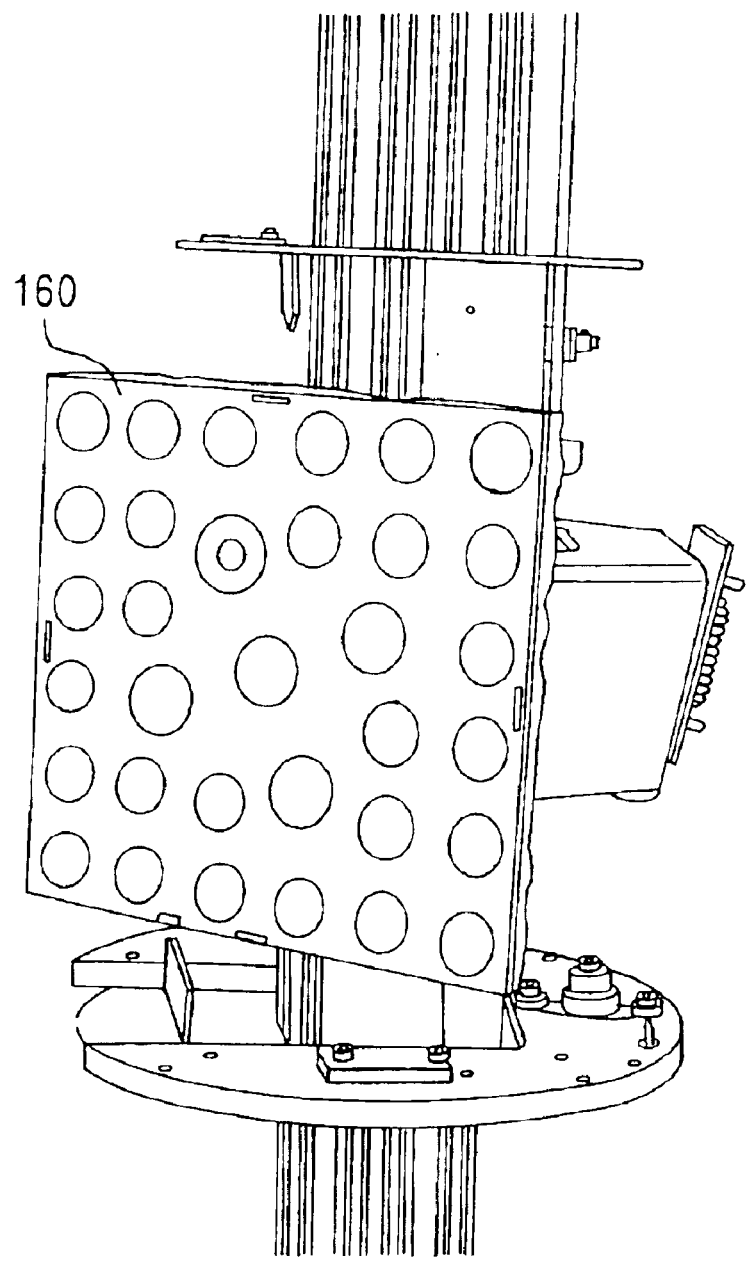
FIGS. 4A–4C show an example of the changes of a calibration target viewed by a calibration camera during the operation of the repositioning mechanism.
Figure 4B:
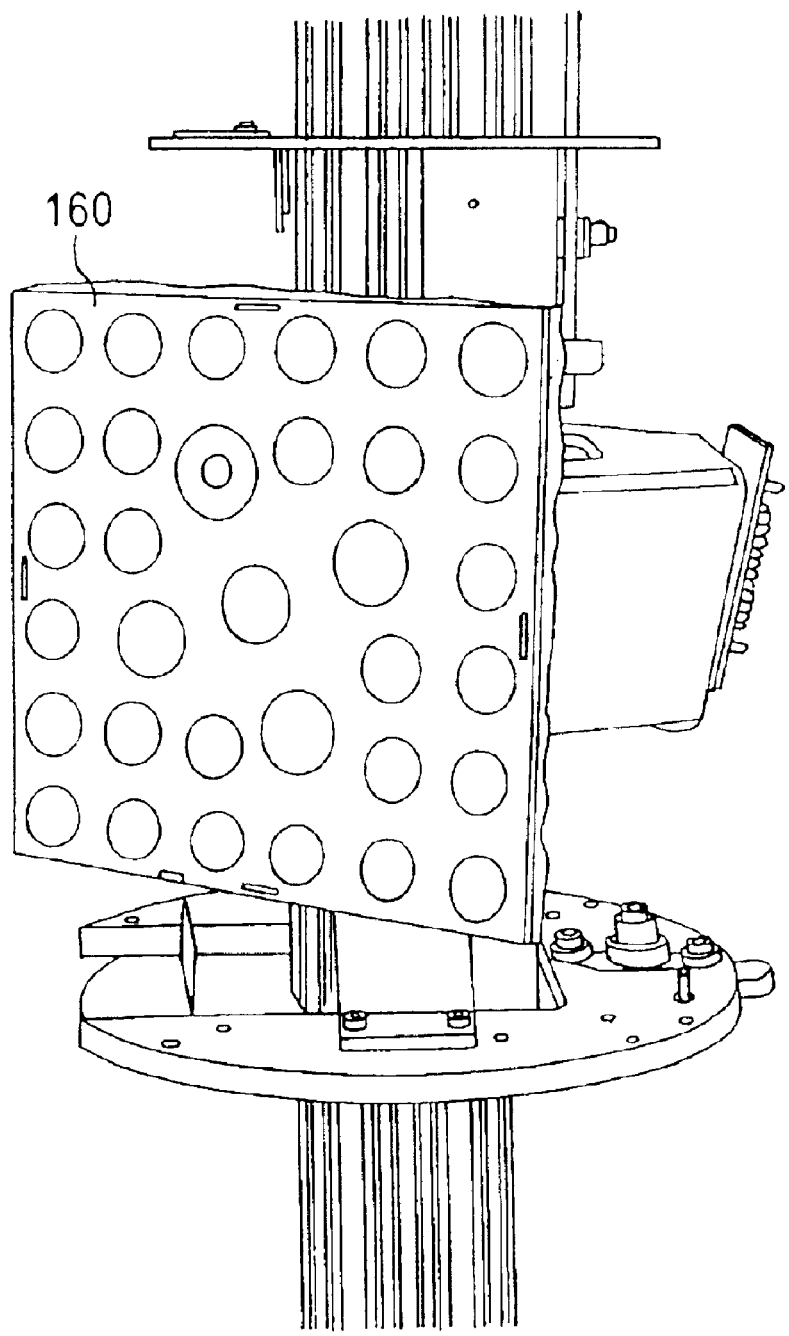
Figure 4C:
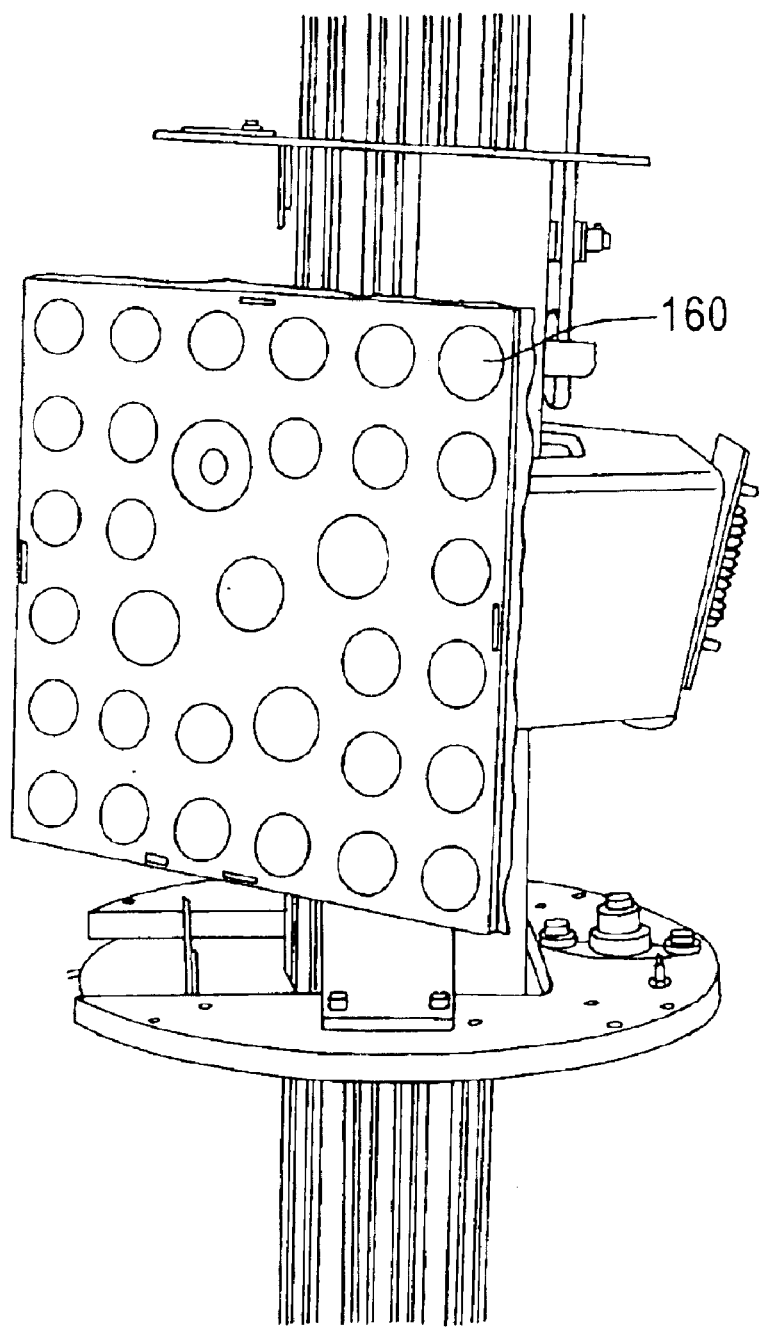

FIGS. 4A–4C show an example of the changes of the calibration target 160 viewed by the calibration camera 20 during the operation of the repositioning mechanism. During turning of the alignment camera 290, the relative position between the calibration camera 20 and the calibration target 160 changes. Thus, the calibration target 160 moves from the right side of the calibration camera's field of view (FIG. 4A) to the middle (FIG. 4B) and then to the left side of the calibration camera's field of view (FIG. 4C). The relative position of the calibration camera and alignment target can be determined based on the changes of the images of the calibration target.

Figure 5A:
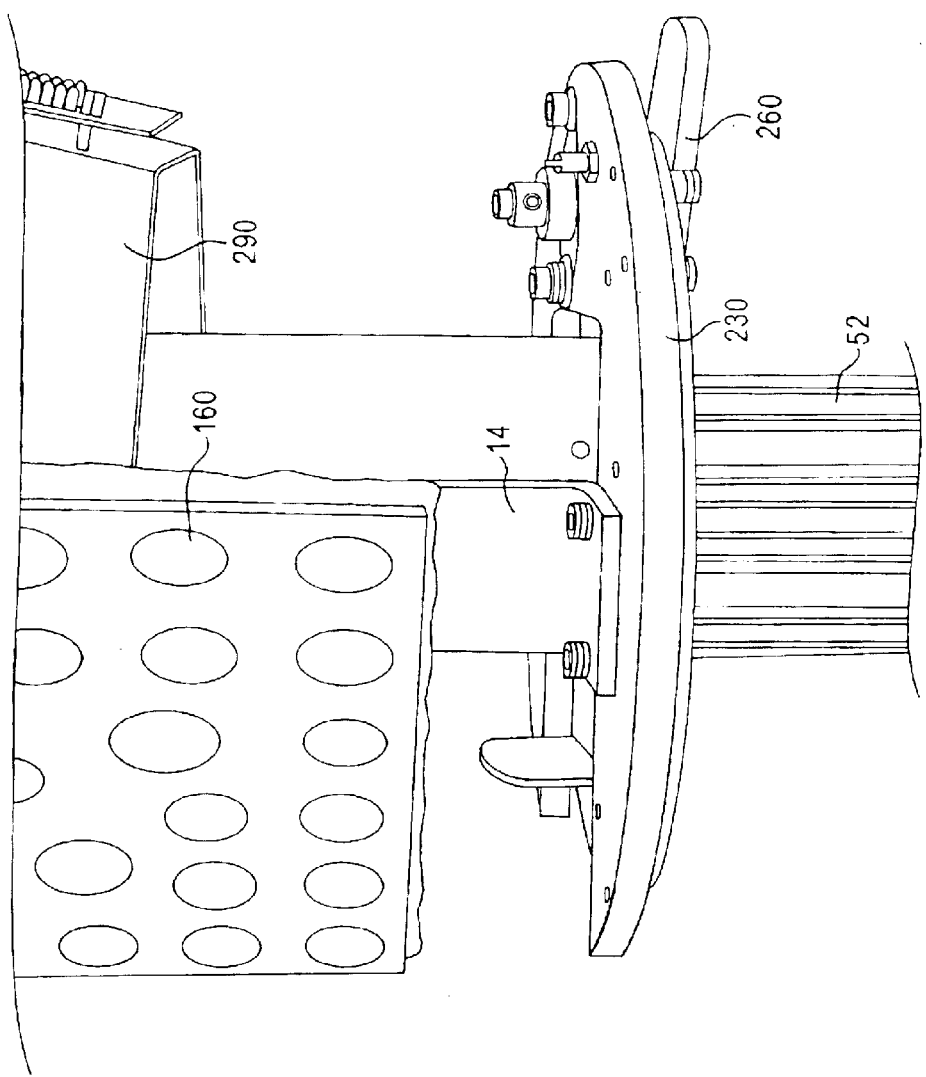
FIGS. 5A–5C illustrate the rotation of a measurement module.
Figure 5B:
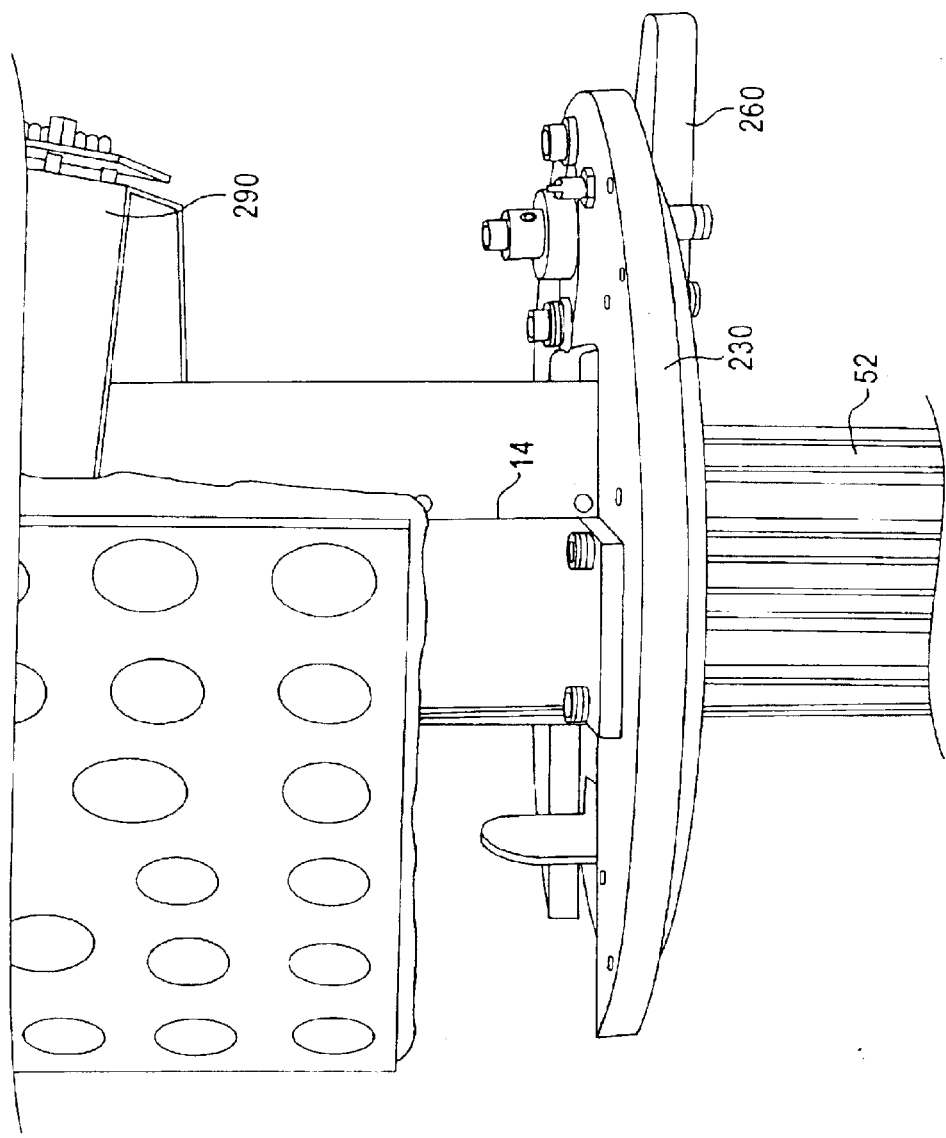
Figure 5C:
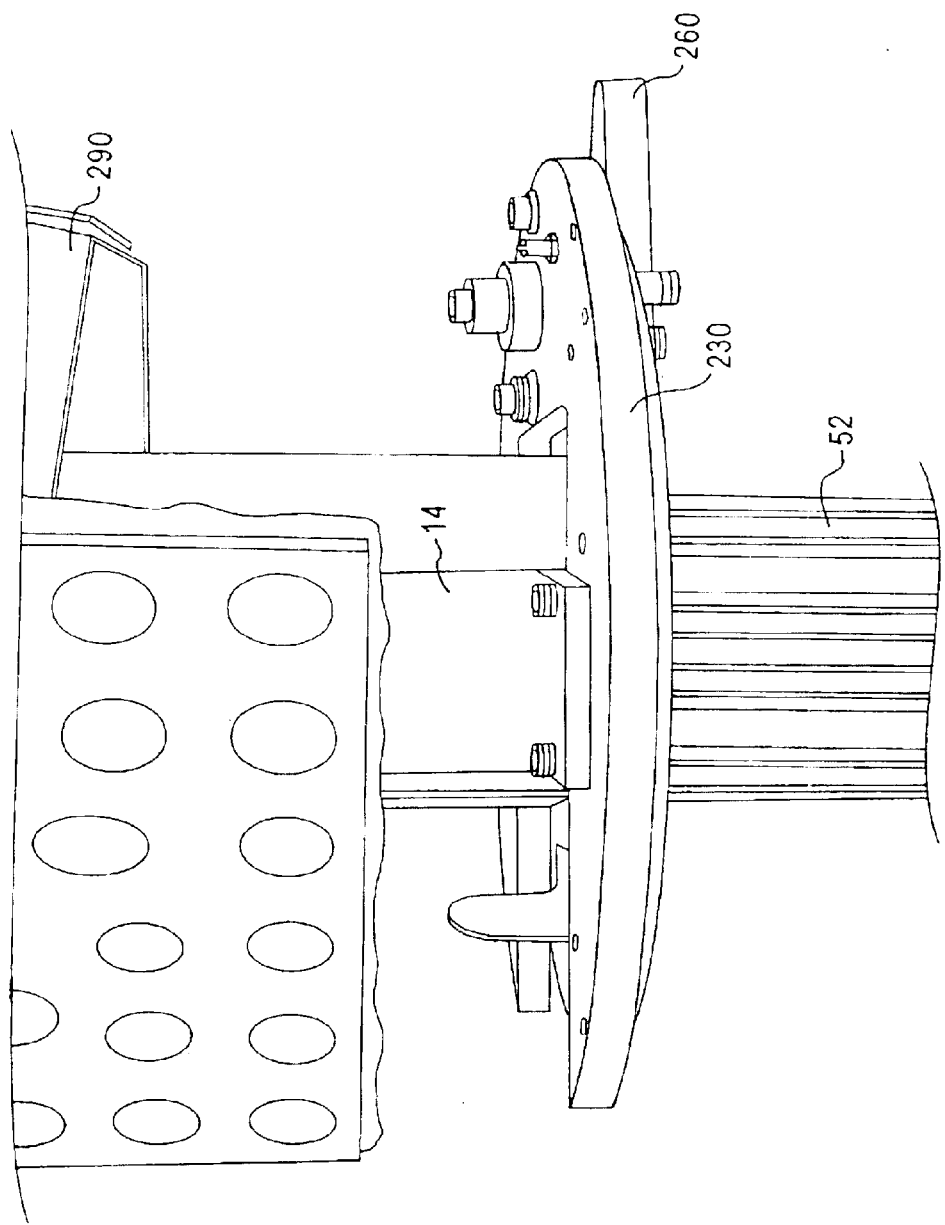

FIGS. 5A–5C show an example of the rotation of one of the measurement module during the process of repositioning the viewing field of one of the alignment cameras. In FIGS. 5A–5C, the calibration target 160 rotates from facing the left side of the figure (FIG. 5A) to almost facing the middle of the figure (FIG. 5C).

Figure 6A:
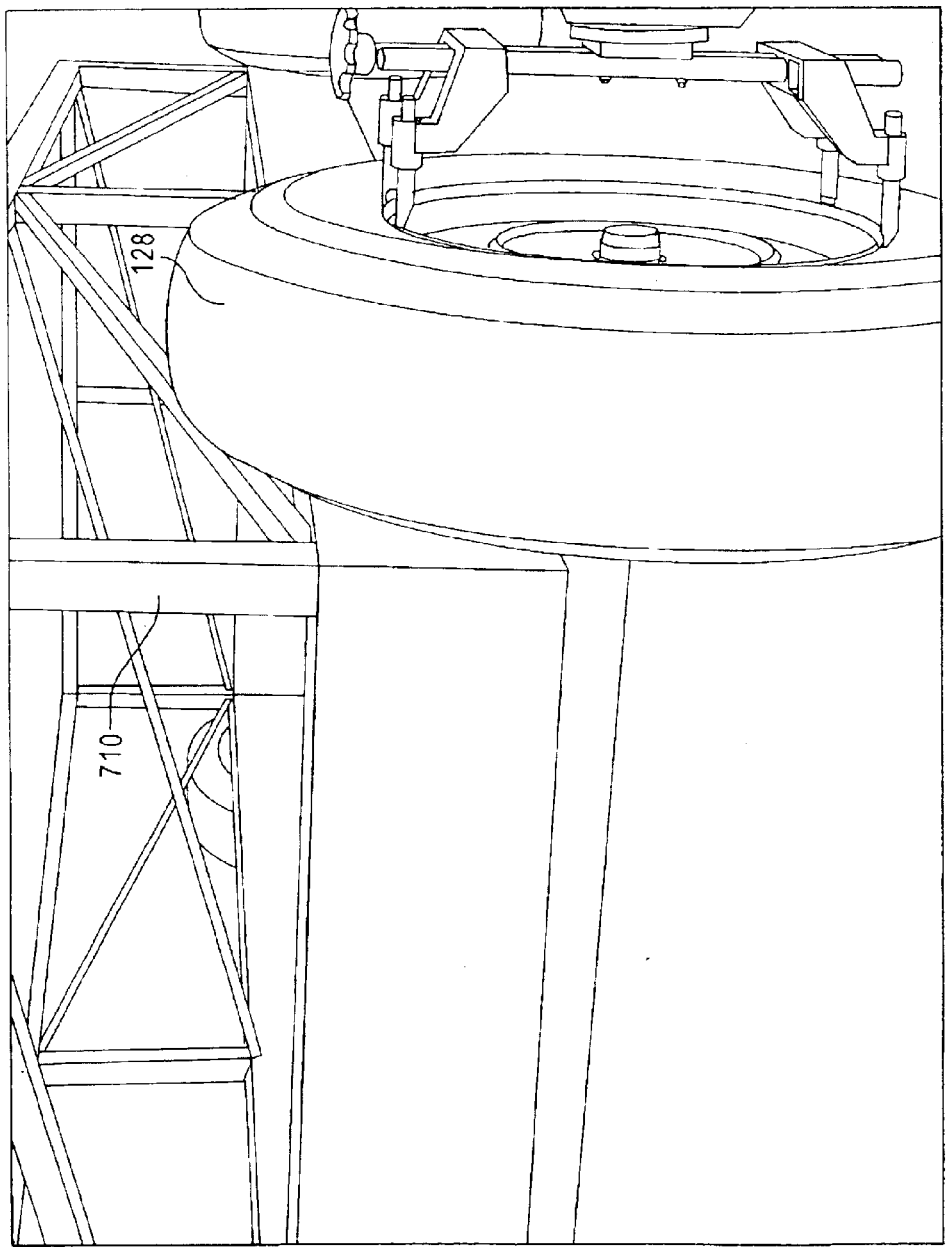
FIGS. 6A–6C show an example of the changes of an alignment target viewed by an alignment camera during the operation of the repositioning mechanism.
Figure 6B:
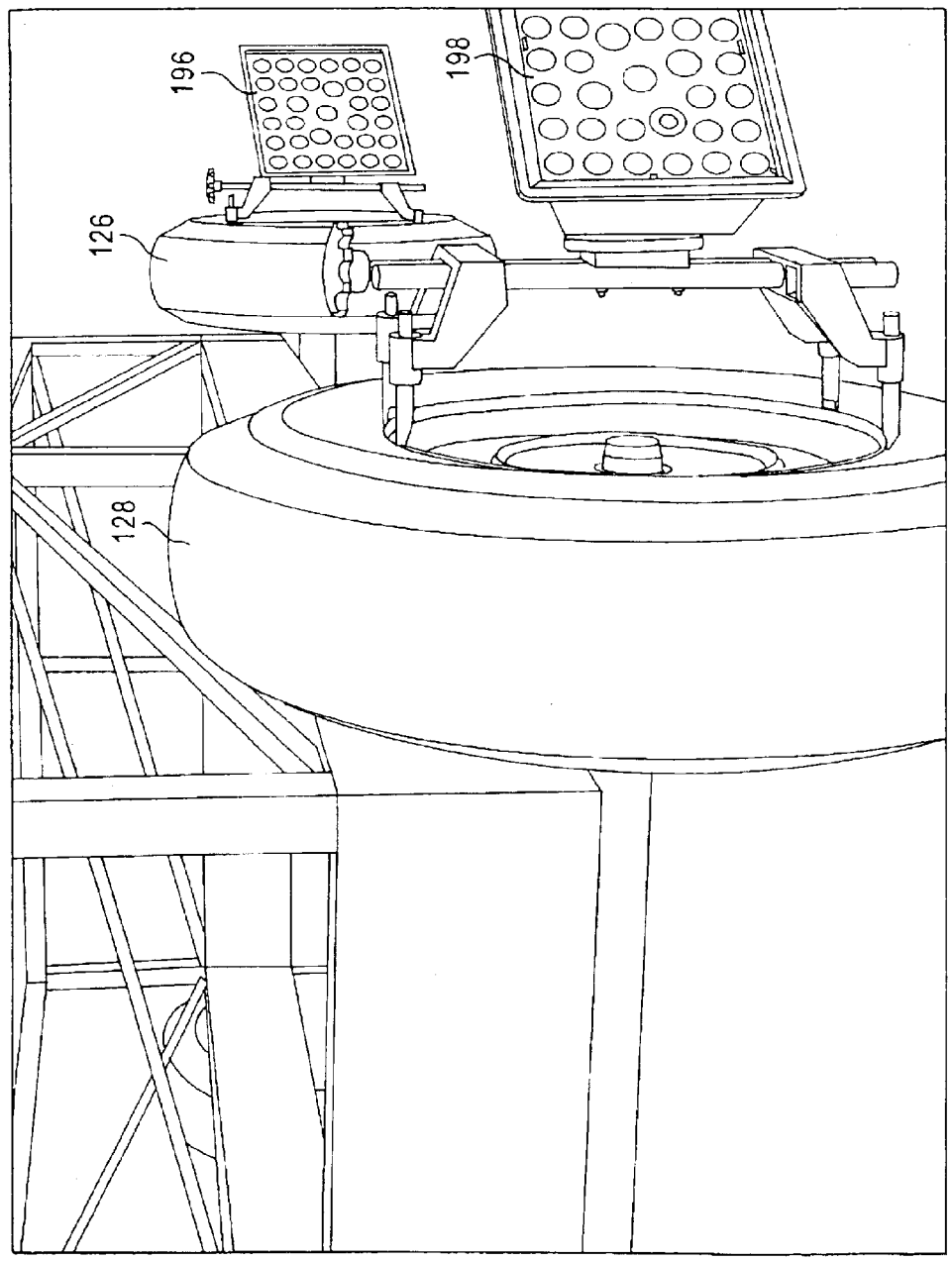
Figure 6C:
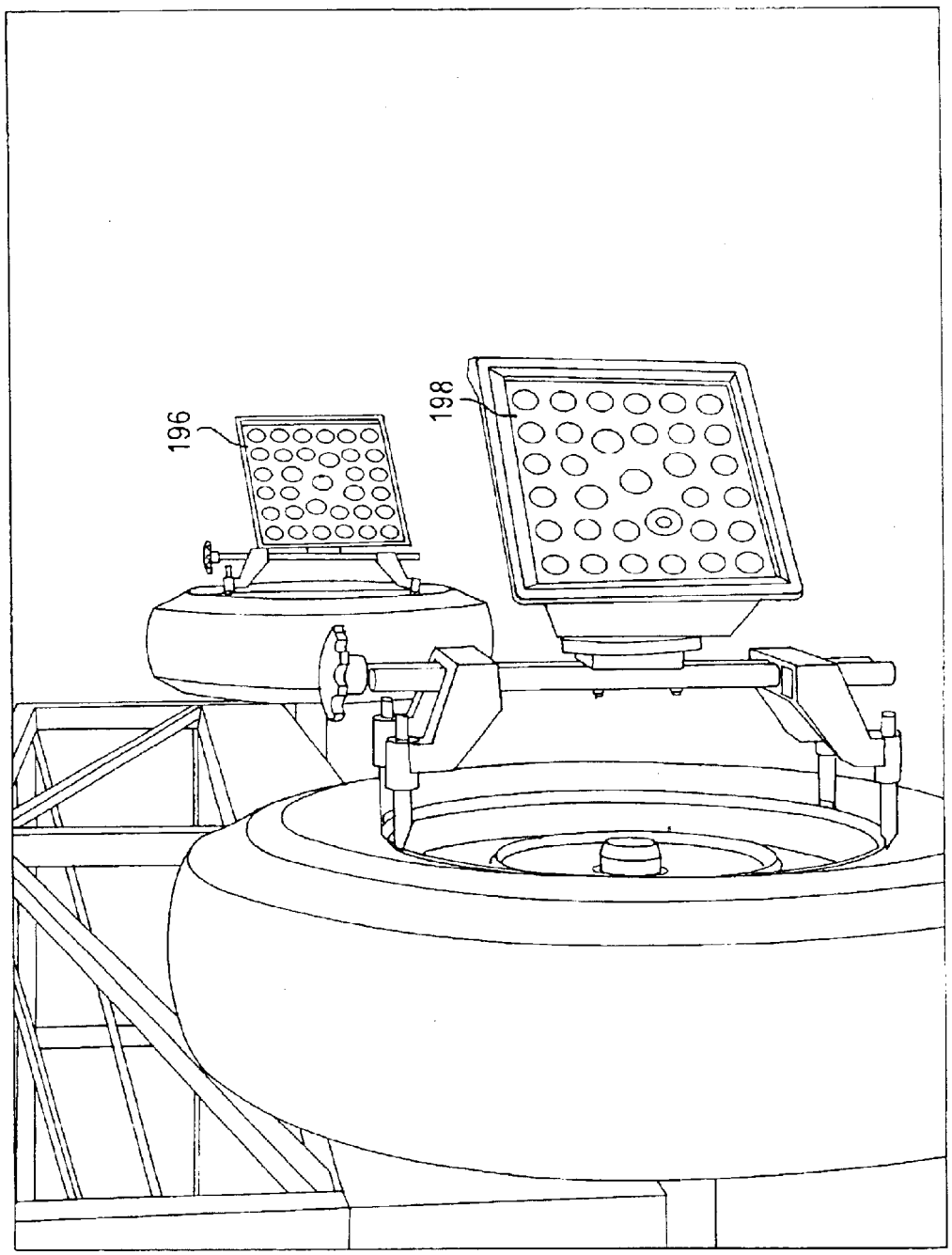

FIGS. 6A–6C show an example of the result of repositioning the viewing field of one of the alignment cameras. In FIG. 6A, the alignment targets are out of the alignment camera's viewing field. By activating the repositioning mechanism, the alignment targets start to appear in the alignment camera's viewing field (FIG. 6B), and eventually to the middle of the viewing field of the alignment camera (FIG. 6C).

Another embodiment of the repositioning mechanism uses a motor to rotate the rotation plate 230. The motor can be any type of motor, such as a servo motor, stepper motor, DC motor, and the like, to rotate the shaft. A motor will be used to replace the bearing 310 and the lever 260. A pivot shaft 262 connects the rotation plate 230 and the supporting plate 210. The outside of the motor is rigidly attached to the rotation plate 230, similar to the outside of the bearing 310. The inside of the motor applies a torque to the shaft 262. The motor enables the pivot shaft 262 to rotate and the non-concentric offset disk 264 to supply a force on the rotation plate 230, similar to a cam.

Figure 7A:
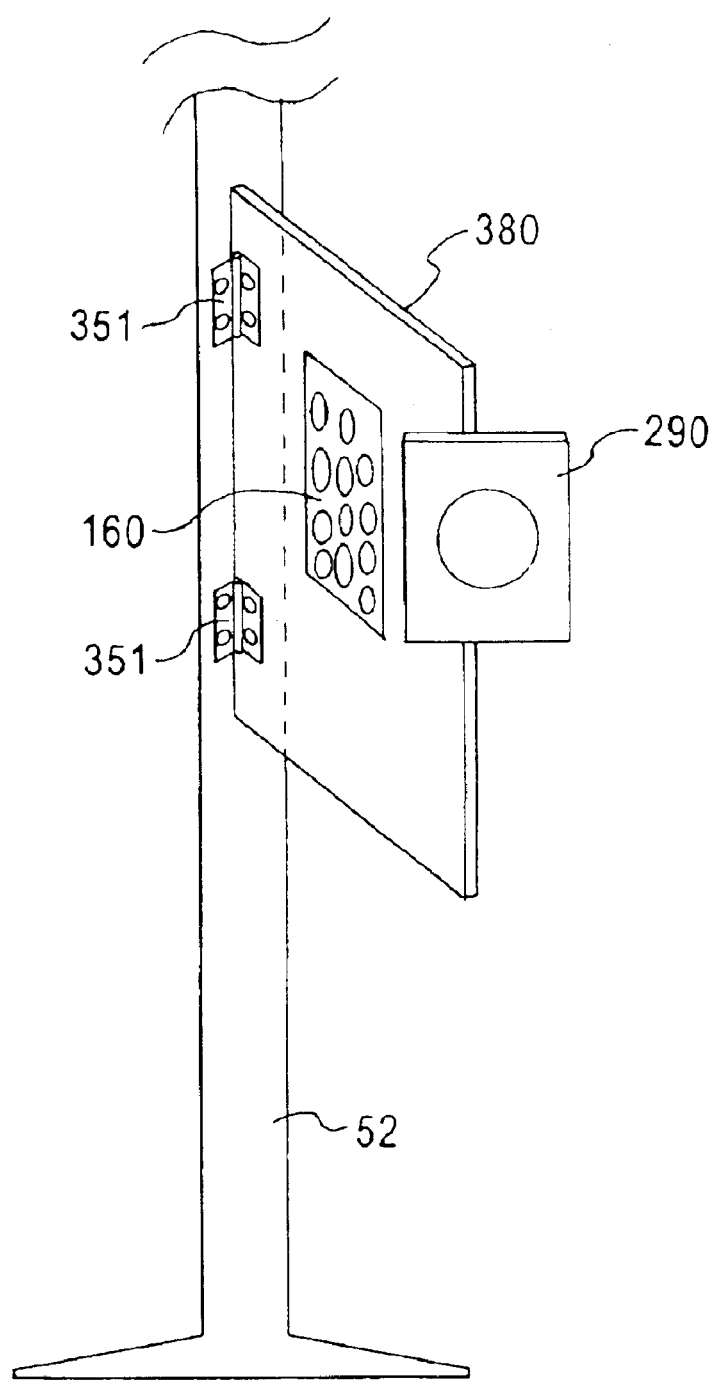
FIG. 7A is a variation of the repositioning mechanism.

FIG. 7A shows another variation of the repositioning mechanism to reposition the viewing fields of the alignment camera along the X-Y plane. The alignment camera 290 and calibration target 160 are rigidly attached to a plate 380, which is attached to the upright 52 via hinges 351. The plate can freely move relative to the upright 52, which in turn repositions the viewing field of the alignment camera. Another measurement module may have the same structure as that shown in FIG. 7C, except that a calibration camera is disposed on the plate facing the calibration target 160. As an alternative, a motor can be used to rotate the rotation plate 230. The motor can be disposed on the hinges to rotate the plate.

Figure 7B:
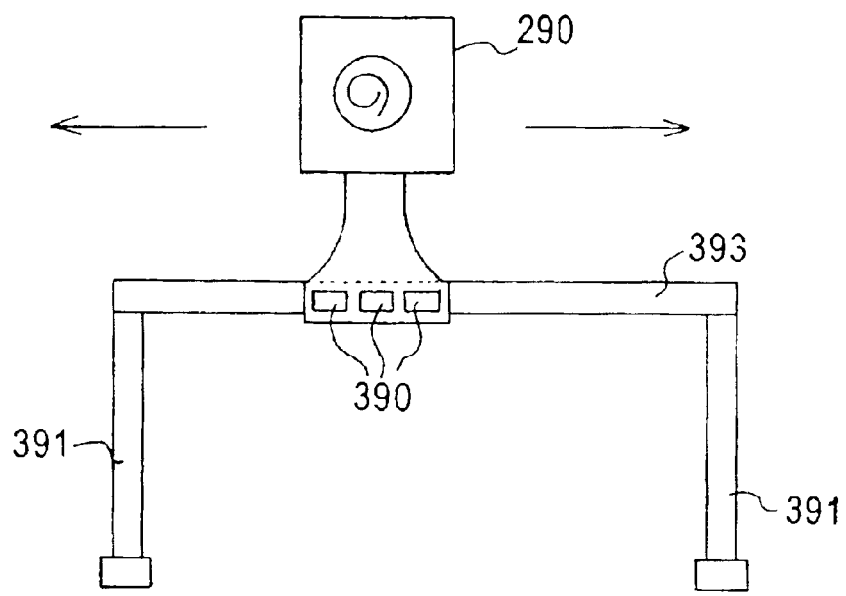
FIGS. 7B–7D show another variation of the repositioning mechanism.
Figure 7D:
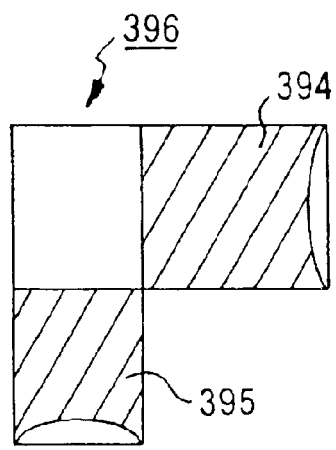
Figure 7C:
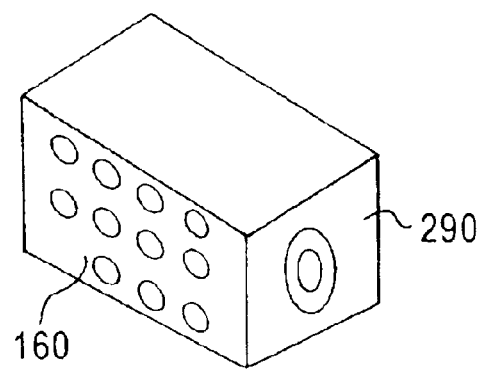

Another variation of the repositioning mechanism to reposition the viewing fields of the alignment camera along the X-Y plane is shown in FIGS. 7B–7D. In FIG. 7B, the repositioning mechanism has a alignment camera 290 riding on a rail 393, which is supported by posts 391. The base of the alignment camera 290 has wheels 390 so that the alignment camera 290 can slide on the rail 393 to reposition the viewing path of the alignment camera. FIG. 7C shows a perspective view the alignment camera 190 with calibration target patterns 160 painted on the outside housing. FIG. 7D shows the top view of an alignment camera module 396 that receives an alignment camera 395 for viewing alignment targets attached to vehicle wheels, and a calibration camera 394 for viewing the calibration target patterns 160. The alignment camera module 396 may be installed in a way similar to that shown in FIG. 7C.

Although the disclosure describes various designs of repositioning mechanism, other variations of repositioning mechanism that are well-known to people skilled in the art to move or turn the alignment cameras along the X-Y plane can be used to implement the measurement modules. In addition, while different repositioning mechanisms are available, the application of the repositioning mechanism is not limited to the use of same types of repositioning mechanism. Different combinations of repositioning mechanism can be used on left and right measurement modules. For example, the measurement module illustrated in FIG. 7B can be used with the type of measurement module illustrated in FIG. 7A.

FIG. 7E describes a repositioning mechanism that can repositioning the viewing field of the alignment camera along the X-Z plane. FIG. 7E shows a partial structure of a measurement module 700. The measurement module 700 has a structure similar to that described in FIG. 2, except that alignment camera 104 pivotally attaches to a rigid alignment camera mount 14 via a pivot 640. Other components of the measurement module are omitted for clearer illustration of the repositioning mechanism.

On the back of the alignment camera 104, a spring 650 connects between the alignment camera 104 and the rotation plate 230. A screw adjuster 660 is disposed between the alignment camera 104 and the rigid alignment camera mount 14. When the screw adjuster 660 is turned, it rotates the alignment camera 140 up or down relative to the hinge 640. Thus, the alignment camera can be tilted up or down along the X-Z plane to accommodate vehicles with different wheel sizes.

Motors, if preferred, can be used to achieve machine-driven repositioning mechanism. For example, motors can be disposed on the hinge (FIG. 7A), the pivot (FIG. 7E), or the wheels (FIG. 7C) to carry out the rotation or moving of the alignment cameras.

Indication of Operation Mode

Figure 8A:
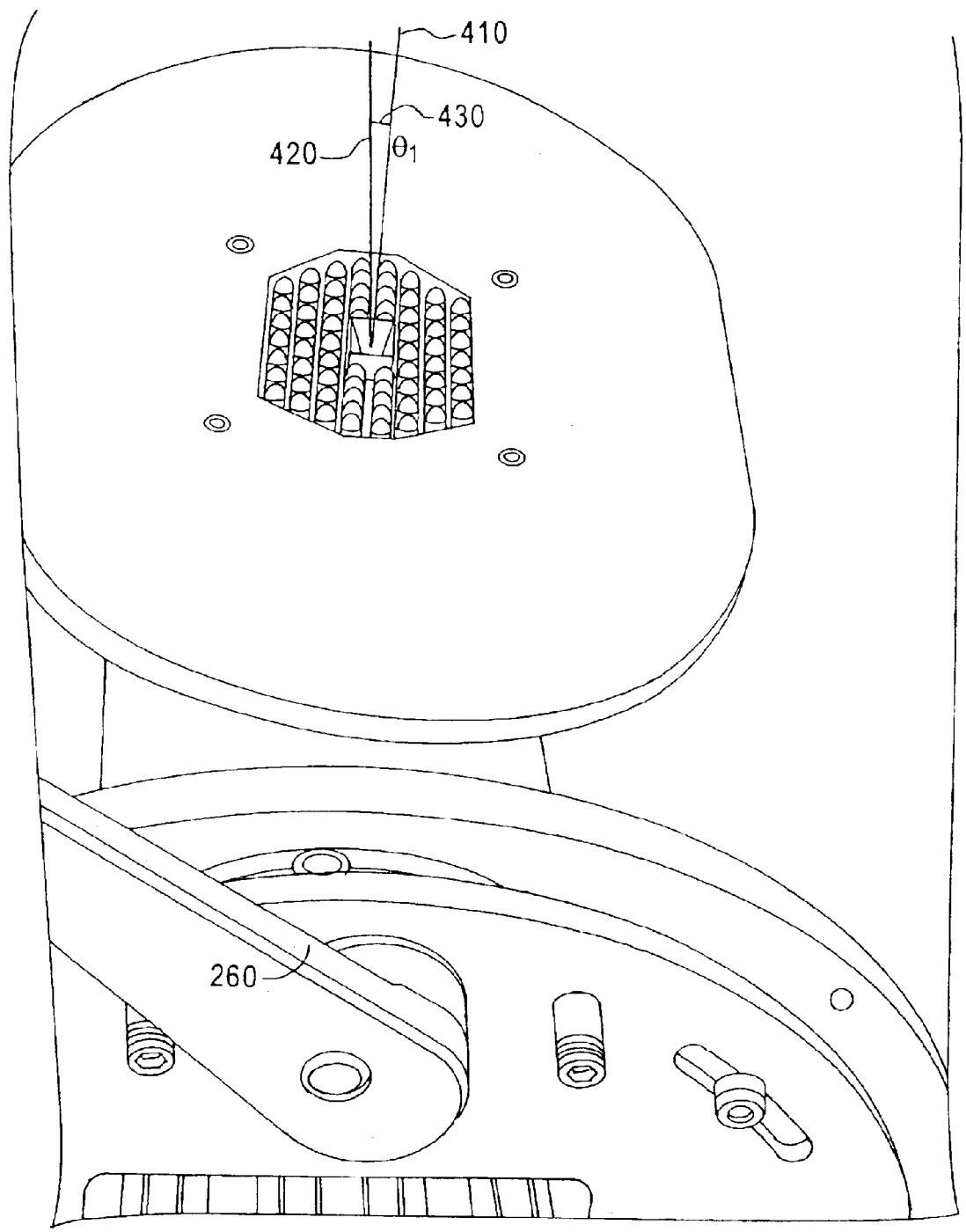
FIGS. 8A–8C show an example to determine the position of the alignment camera.
Figure 8B:
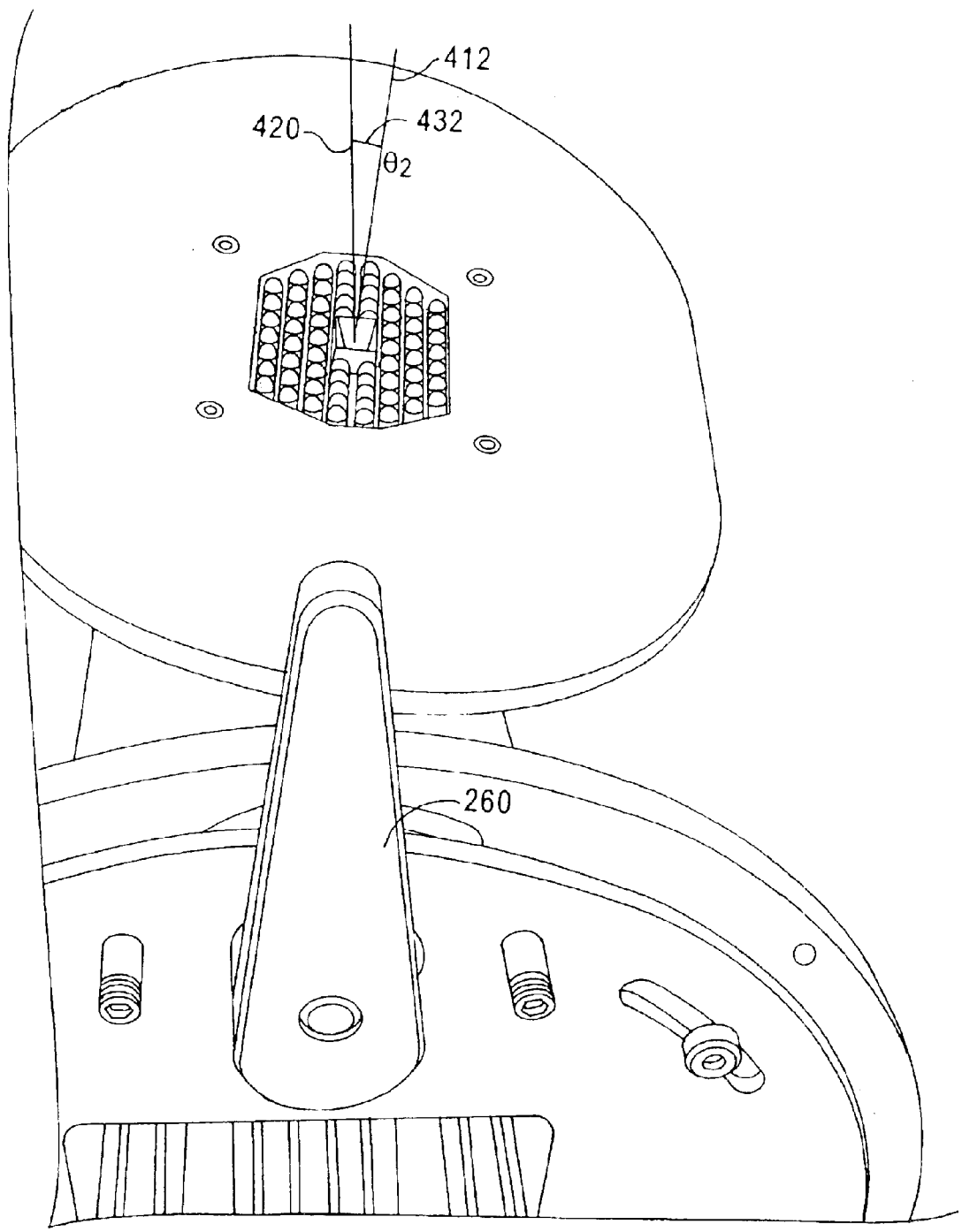
Figure 8C:
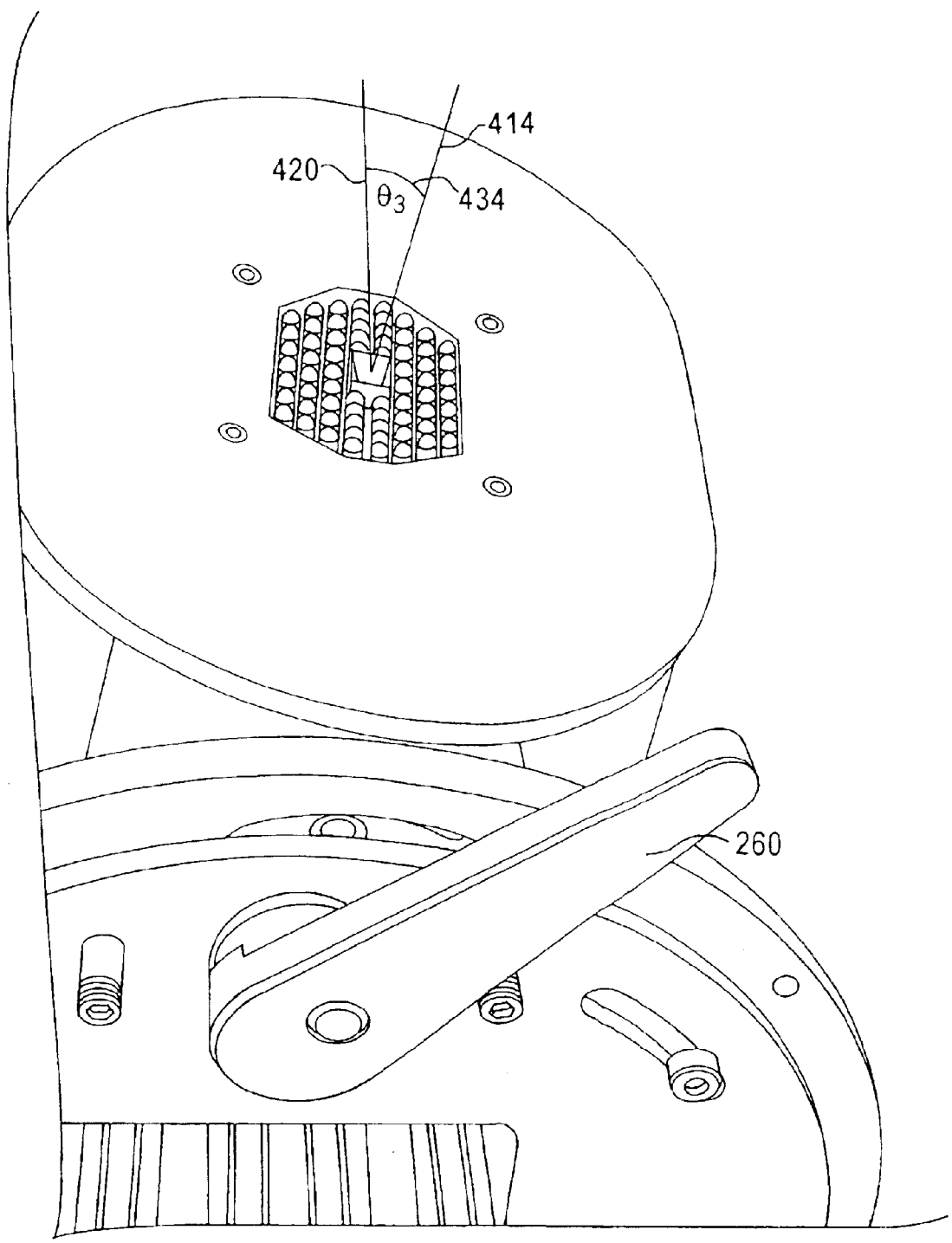

As shown in FIG. 1B, during repositioning the viewing fields of the alignment cameras from a wide mode to a narrow mode (P1 to P2) or vice versa, the angle between these two viewing fields is small, sometimes around six degrees. This six-degree rotation is not easily observable by human eyes. Thus, technicians may have difficulties knowing the exact position of the viewing angles, or whether a measurement module is set to a wide mode or a narrow mode. FIGS. 8A–8C show a way to determine the operation mode of the measurement modules.

In FIG. 8A, the lever 260 is positioned set to the left. At this time, an axis 410 normal to the alignment camera surface forms an angle θ1 with a reference axis 420. In FIG. 8B, by turning the lever 260 from the left position to the middle, the axis normal to the alignment camera surface is now axis 432, and forms an angle θ2 with the reference axis 420, wherein θ2>θ1. In FIG. 8C, when the lever 260 is further turned to the far right, the axis normal to the alignment camera surface is now axis 434, and forms an angle θ3 with the reference axis 420, wherein θ3>θ2>θ1.

Though the angle difference between θ3 and θ1 (approximately six degrees), the lever 260 moves from the left to the right (approximately 80 degrees). Thus, the variation in the lever angle is readily observable during the rotation of the alignment camera. Therefore, the lever angle forms visual feedback to the operator during the alignment camera rotation. By viewing the changes in the lever angle, the operator can determine whether the alignment camera is in wide mode, narrow mode, or somewhere between the two modes.

As an option, a sensor is used to detect the rotation of the alignment camera and generate signals representing rotation status of the alignment camera. The signals can be fed to a data processing system and output to a user interface to show the status of rotation. The sensor can be disposed under the alignment camera to determine the rotation angle. Alternatively, the sensor can be disposed on or near the lever to detect the rotation angle of the lever (FIG. 2), the hinges (FIG. 3C), or the rail (FIG. 3D).

Locating Alignement Alignment Targets

Since vehicles vary in sizes, the aligner has to determine whether the vehicle brought in for alignment is a wide vehicle or a narrow vehicle, and where to position the viewing fields of the alignment cameras so that all the alignment targets properly appear in the viewing fields of the alignment cameras. One way of repositioning the viewing fields of the alignment cameras is to have the technician go to the measurement module and manually adjust the direction of the alignment cameras until the alignment target images properly appear in the viewing fields of the alignment cameras.

Locating alignment targets can also be achieved automatically without human intervention. One approach is to defaultly set the aligner to one of the operation modes, i.e., either wide mode or narrow mode, before each alignment. The aligner will determine initially for each alignment camera if alignment targets appear acceptably within a predetermined field of the viewing field. In order to determine if the alignment targets properly fall within a predetermined field of the viewing field, the aligner may have access to pre-stored images of alignment targets properly fall within the predetermined field of the viewing field. By constantly comparing the image signals captured by the alignment cameras with the pre-stored image, the aligner can determine if the alignment targets properly fall within the predetermined field of the viewing field.

If the aligner is set to the wide mode by default, and if the alignment targets fall properly within a predetermined field of the viewing field, the aligner determines that the vehicle under alignment is a wide vehicle and alignment can start without further adjustment of the viewing fields of the alignment cameras.

On the other hand, if at least one alignment target fails to appear acceptably within the predetermined field of the viewing field, the system determines that the vehicle under test is a narrow vehicle and the alignment cameras should be adjusted towards the narrow mode until the alignment targets properly appear in the viewing field.

Conversely, the aligner may be preset at the narrow mode. The operation of the aligner is similar to that discussed above.

Another approach to automatically locate the alignment targets is to use an automatic sweep process. In the automatic sweep process, before each alignment, the aligner will determine initially for each alignment camera if alignment targets appear acceptably within a predetermined field of the viewing field. If the alignment targets fall properly within a predetermined field of the viewing field, the viewing field of the alignment camera will not receive any further adjustment.

On the other hand, if at least one alignment target fails to appear acceptably within the predetermined field of the viewing field, the alignment camera that does not have the alignment targets fall within the determined field is controlled to sweep through available positions, for example, from narrow to wide, until the alignment targets properly appear in the predetermined viewing field.

Hardware Overview of the Data Processing System

The aligner includes a data processing system to conduct numerous tasks, such as processing positional signals, calculating relative positions, providing a user interface to the operator, displaying alignment instructions and results, receiving commands from the operator, sending control signals to reposition the alignment cameras, etc. The data processing system receives positional signals from the measurement modules and sends control signals to control the operation of the repositioning mechanism.

Figure 9:
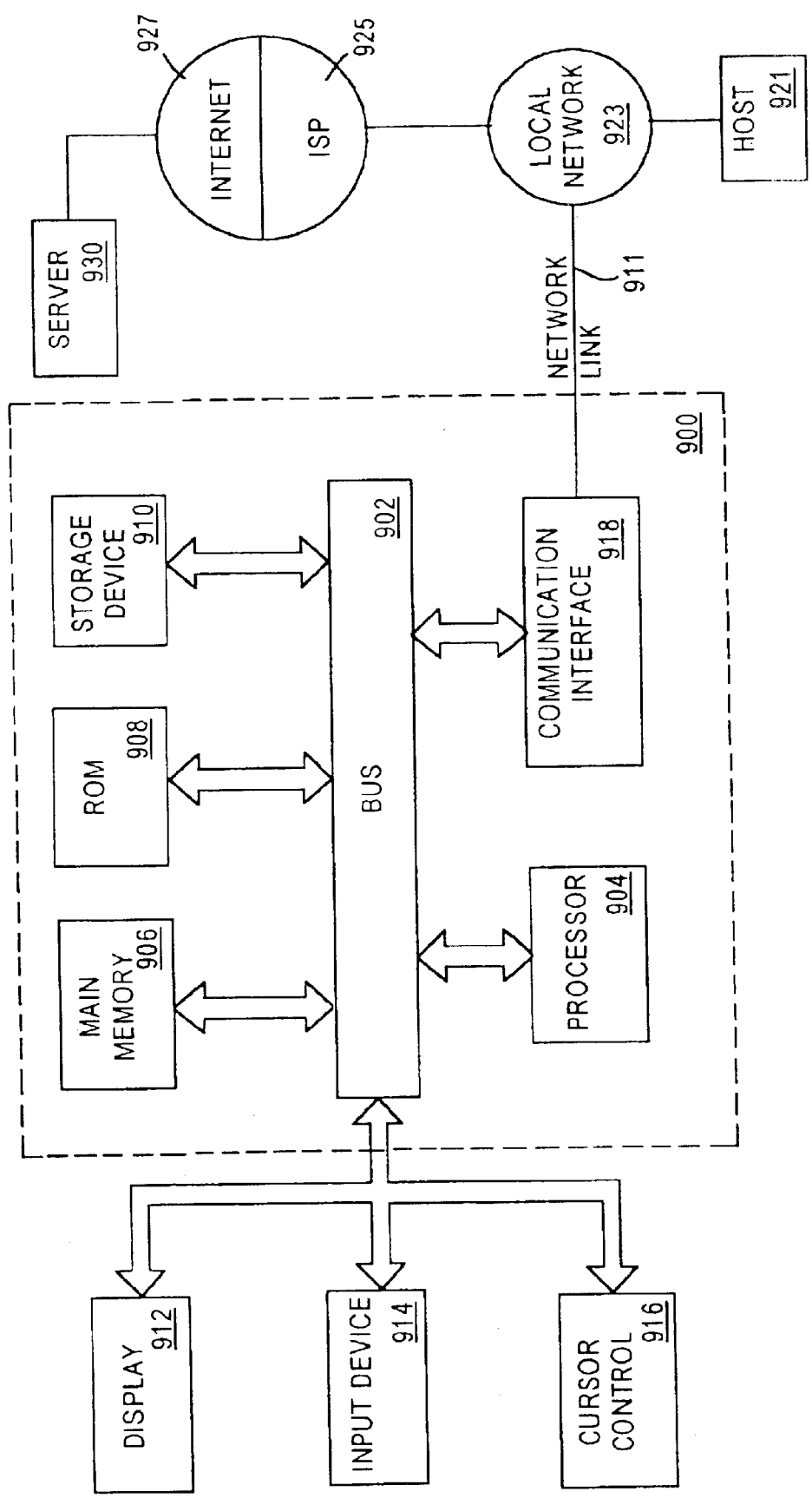
FIG. 9 is a block diagram of a data processing system upon which an exemplary position determination system may be implemented.

FIG. 9 is a block diagram that illustrates a data processing system 900 upon which an embodiment of the disclosure may be implemented. Data processing system 900 includes a bus 902 or other communication mechanism for communicating information, and a processor 904 coupled with bus 902 for processing information. Data processing system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Data processing system 900 further includes a read only memory (ROM) 909 or other static storage device coupled to bus 902 for storing static information and instructions for processor 904. A storage device 910, such as a magnetic disk or optical disk, is provided and coupled to bus 902 for storing information and instructions.

Data processing system 900 may be coupled via bus 902 to a display 912, such as a cathode ray tube (CRT), for displaying information to an operator. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912.

The data processing system 900 is controlled in response to processor 904 executing one or more sequences of one or more instructions contained in main memory 906. Such instructions may be read into main memory 906 from another machine-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the disclosure. Thus, embodiments of the disclosure are not limited to any specific combination of hardware circuitry and software.

The term "machine readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of machine readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, a carrier wave as described hereinafter, or any other medium from which a data processing system can read.

Various forms of machine-readable media may be involved in carrying one or more sequences of one or more instructions to processor 904 for execution. For example, the instructions may initially be carried on a magnetic disk of a remote data processing. The remote data processing system can load the instructions into its dynamic memory and send the instructions over a telephone line using a modem. A modem local to data processing system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Data processing system 900 also includes a communication interface 919 coupled to bus 902. Communication interface 919 provides a two-way data communication coupling to a network link 920 that is connected to a local network 922. For example, communication interface 919 may be an integrated services digital network (ISDN) card or a modem to provide a data communication connection to a corresponding type of telephone line. As another example, communication interface 919 may be a local area network (LAN) card to provide a data communication connection to a compatible LAN. Wireless links may also be implemented. In any such implementation, communication interface 919 sends and receives electrical, electromagnetic or optical signals that carry digital data streams representing various types of information.

Network link 920 typically provides data communication through one or more networks to other data devices. For example, network link 920 may provide a connection through local network 922 to a host data processing system 924 or to data equipment operated by an Internet Service Provider (ISP) 926. ISP 926 in turn provides data communication services through the world wide packet data communication network now commonly referred to as the "Internet" 929. Local network 922 and Internet 929 both use electrical, electromagnetic or optical signals that carry digital data streams. The signals through the various networks and the signals on network link 920 and through communication interface 919, which carry the digital data to and from data processing system 900, are exemplary forms of carrier waves transporting the information.

Data processing system 900 can send messages and receive data, including program code, through the network (s), network link 920 and communication interface 919. In the Internet example, a server 930 might transmit a requested code for an application program through Internet 929, ISP 926, local network 922 and communication interface 919. In accordance with embodiments of the disclosure, one such downloaded application provides for automatic calibration of an aligner as described herein.

The data processing also has various signal input/output ports (not shown in the drawing) for connecting to and communicating with peripheral devices, such as USB port, PS/2 port, serial port, parallel port, IEEE-1394 port, infra red communication port, etc., or other proprietary ports. The measurement modules may communicate with the data processing system via such signal input/output ports.

User Interface

Figure 10A:
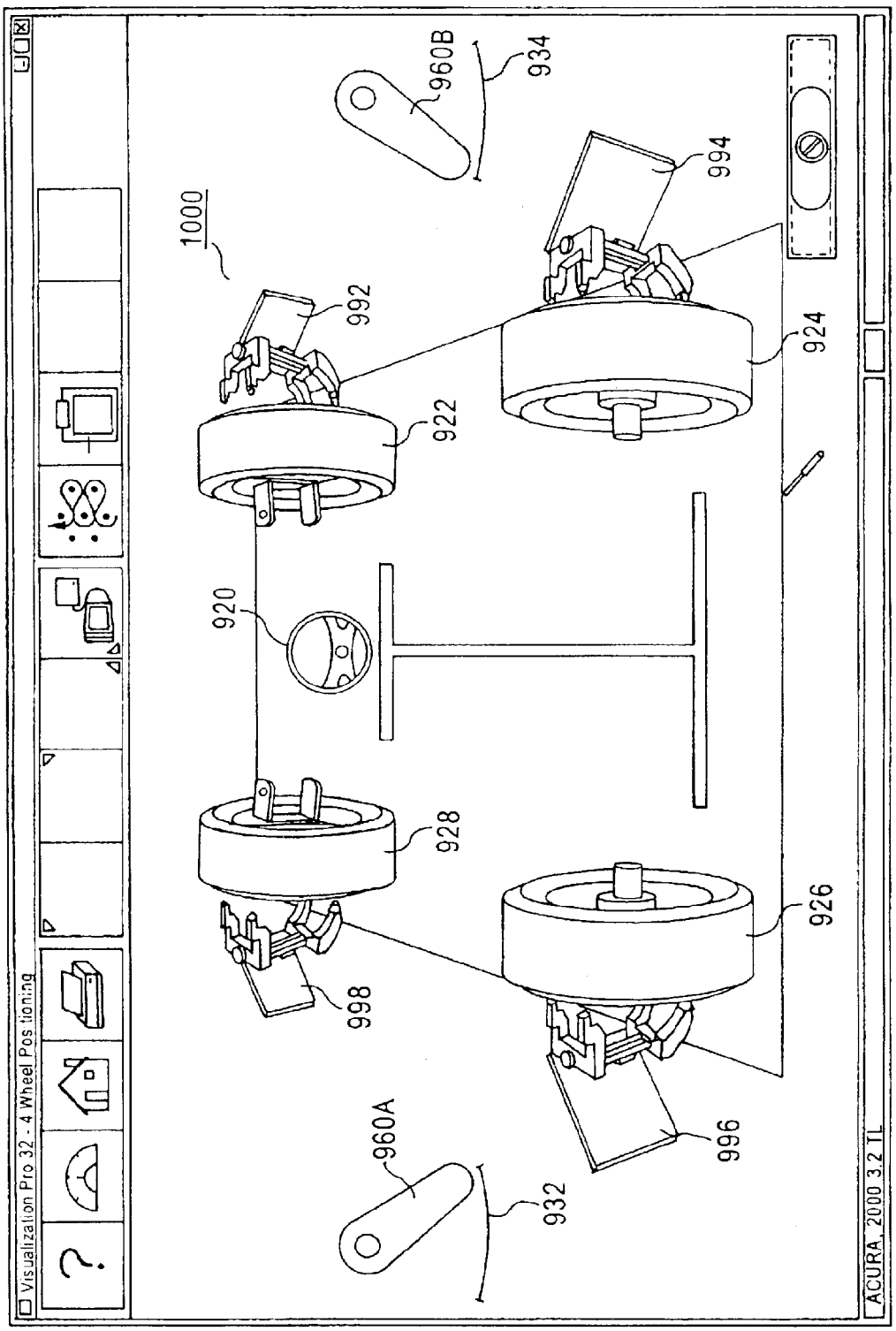
FIGS. 10A–10C show screen shots of an exemplary user interface of the position determination system.
Figure 10B:
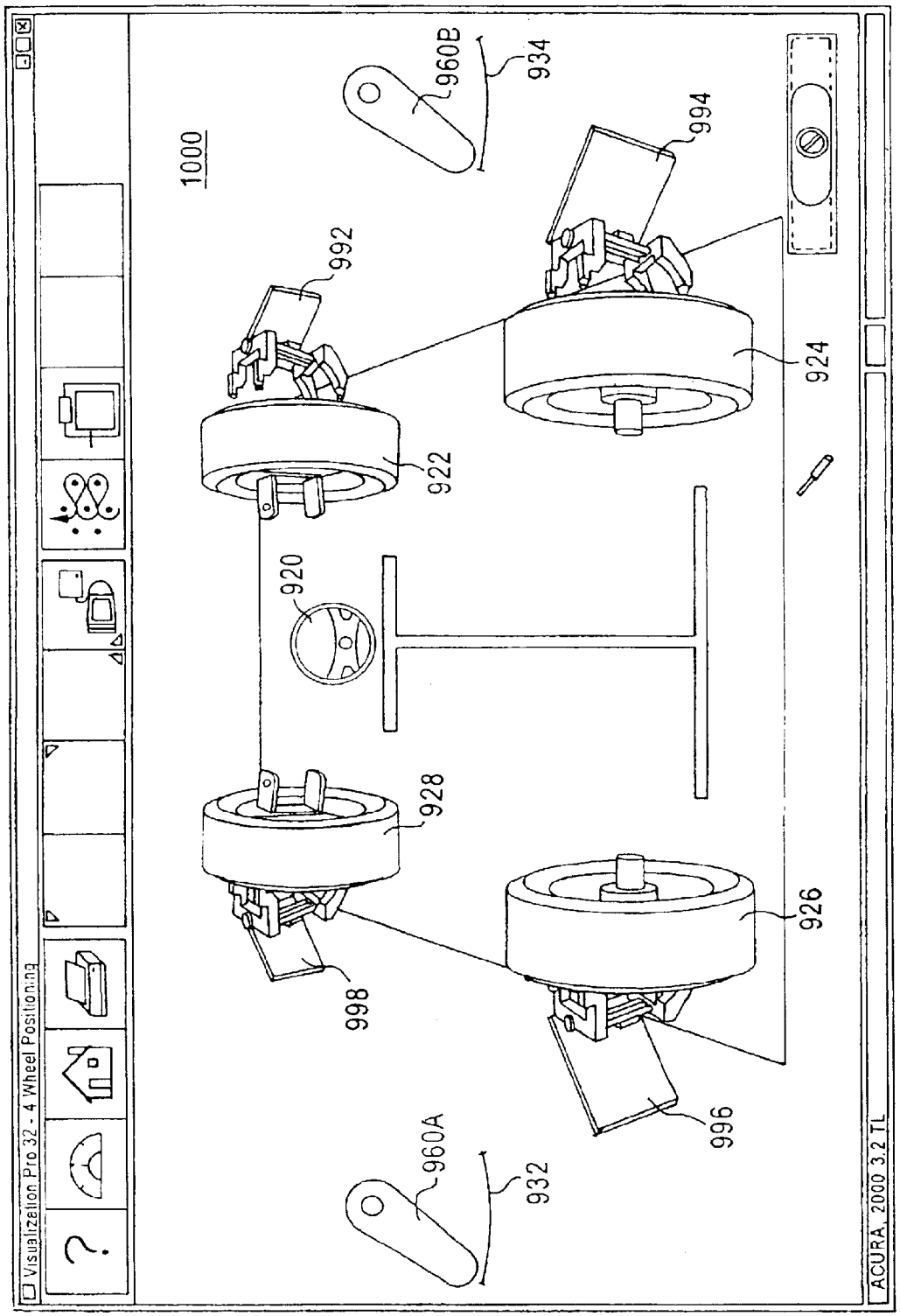
Figure 10C:
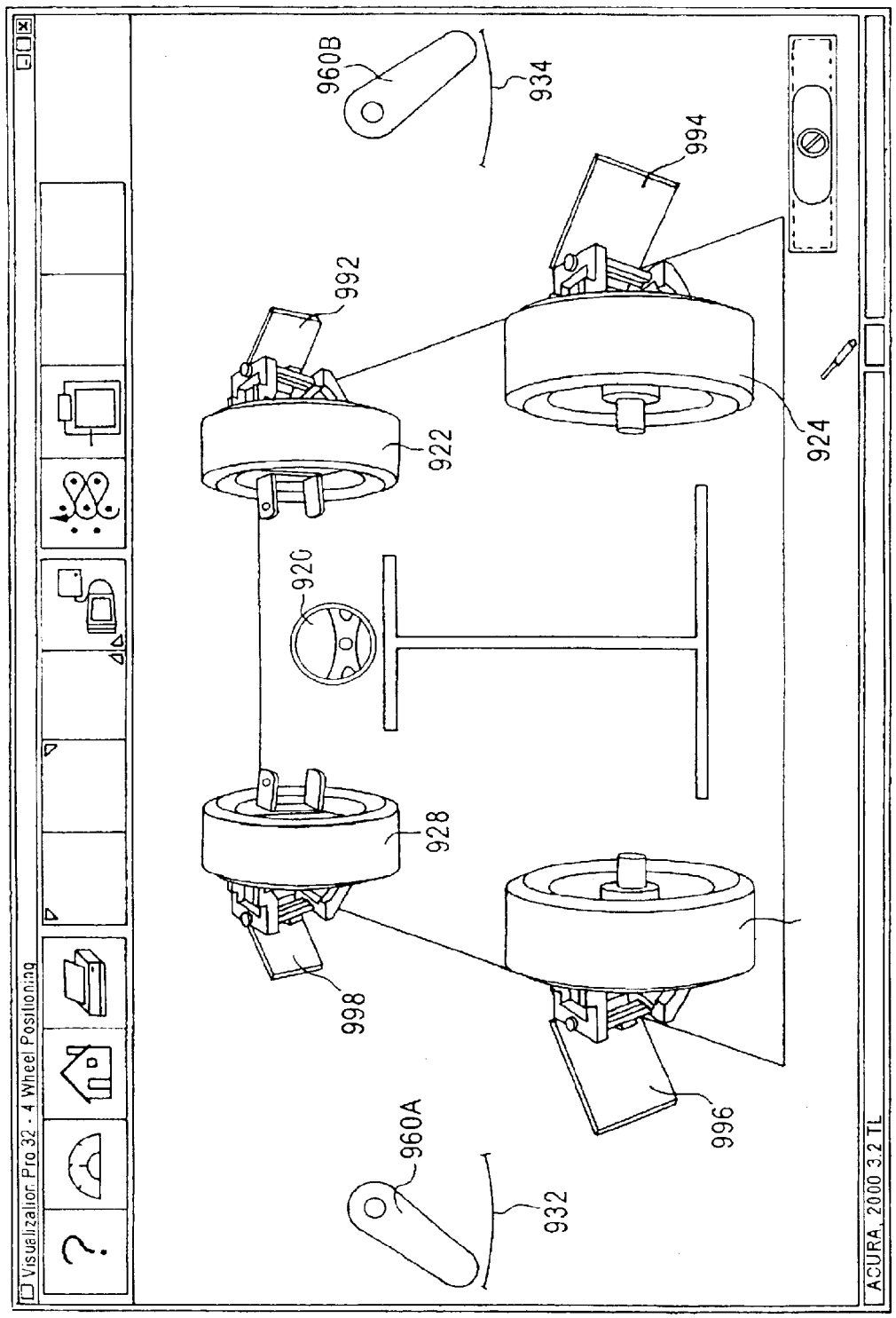

The data processing system provides a user interface to communicate with and solicit input from the operator. FIGS. 10A–10C show an exemplary user interface screen upon which the present disclosure may be implemented.

The upper portion of the screen provides various clickable command buttons representing different functions to solicit input command from the operator. A simplified representation of a vehicle 1000 is shown. The vehicle 1000 has a turning wheel 920, wheels 922, 924, 926, 928. Alignment targets 992, 994, 996, 998 are shown with the wheels. Two alignment camera position indicators 932, 934 are provided to show the respective position of the alignment cameras' viewing fields. When the alignment camera rotates, the needles 960A, 960B move correspondingly. When the needles 960A, 960B point towards to the vehicle 900, the alignment cameras are in the narrow mode. When the needles 960A, 960B point away from the vehicle 900, the alignment cameras are in the wide mode.

The user interface may provide indications to the operator as to whether the alignment targets are within proper viewing fields of the alignment cameras. For example, different colors can be used for the alignment targets 992, 994, 996, 998 to indicate if the alignment targets are proper seen by the alignment cameras: if the alignment targets cannot be seen by the alignment camera, the alignment targets will be shown in a first color, such as white, and when the alignment targets can be seen by the alignment camera, the alignment targets will be shown in a second color, such as red.

In FIG. 10A, all the alignment targets are shown in white, which means that none of the alignment targets can be seen by the alignment cameras. The alignment camera position indicators indicate that the alignment cameras are in the narrow mode because both the needles 960A, 960B point towards to the vehicle 1000. Thus, based on the information conveyed by the user interface, the operator now knows that adjusting the alignment cameras is required. The operator may send control commands, such as by moving the needle by using a mouse, to the measurement modules to control repositioning of alignment cameras' viewing fields.

In FIG. 10B, the needle 960A now points away from the vehicle 1000, and the needle 960B still maintains the same position as in FIG. 10A. In addition, the colors of the alignment targets 996, 998 now turn red, while the colors of the alignment targets 992, 994 are still white. Thus, the interface shows that one of the alignment cameras has been adjusted and the alignment targets 996, 998 can now be properly seen by that alignment camera.

In FIG. 10C, both the needles 960A, 960B point away from the vehicle 1000, and the colors of all the alignment targets 992, 994, 996, 998 now turn red. Accordingly, both of the alignment camera positions have been adjusted and the alignment targets 992, 994, 996, 998 can now be properly seen by the alignment cameras.

The disclosure has been described with reference to specific embodiments thereof. It will, however, be evident that various modifications and changes may be made thereto without departing from the broader spirit and scope of the disclosure. The specification and drawings are, accordingly, to be regarded in an illustrative rather than a restrictive sense.

What is claimed is:

1. A position determination system, comprising:
    a first measuring apparatus, including
    a first sensing device having a sensing field for obtaining positional data of a first testing target relative to the first sensing device;
    a calibration target rigidly linked to the first sensing device, wherein the positional relationship between the first sensing device and the calibration target is known; and
    means for repositioning the sensing field of the first sensing device without altering the positional relationship between the first sensing device and the calibration target; and
    a second measuring apparatus, including
    a second sensing device having a sensing field for obtaining positional data of a second testing target relative to the second sensing device;
    a calibration sensing device rigidly linked to the second sensing device for obtaining positional data of the calibration target relative to the calibration sensing device, wherein the positional relationship between the second sensing device and the calibration sensing device is known;
    means for repositioning the sensing field of the second sensing device without altering the positional relationship between the second sensing device and the calibration sensing device; and
    a data processing system configured to couple to the first and second sensing devices to carry out the machine-implemented steps of:
    determining whether the first testing target is within a specific sensing field of the first sensing device by comparing data sensed by the first sensing device with prestored data representing the first testing target being within the specific sensing field of the first sensing device; and
    determining whether the second testing target is within a specific sensing field of the second sensing device by comparing data sensed by the second sensing device with prestored data representing the second testing target being within the specific sensing field of the second sensing device.

2. The system of claim 1, wherein the data processing system is configured to further perform the machine-implemented steps of:
    receiving signals representing positional data of the first testing target relative to the first sensing device;
    receiving signals representing positional data of the second testing target relative to the second sensing device;
    receiving signals representing positional data of the calibration target relative to the calibration sensing device; and
    determining a positional parameter of the first testing target and a positional parameter of the second testing target based on the positional relationship between the first sensing device and the calibration target, the positional relationship between the second sensing device and the calibration sensing device, the positional data of the first testing target relative to the first sensing device, the positional data of the second testing target relative to the second sensing device, and the positional data of the calibration target relative to the calibration sensing device.

3. The system of claim 1, wherein the first sensing device, the second sensing device and the calibration sensing device are machine vision devices.

4. The system of claim 3, wherein the machine vision devices are alignment cameras.

5. The system of claim 1, wherein the first testing target, the second testing target and the calibration target include light emitting sources.

6. The system of claim 5, wherein the first sensing device, the second sensing device and the calibration sensing device include light sensors.

7. The system of claim 1, wherein the first measuring apparatus further includes a first supporting structure to which the first sensing device and the calibration target attach, and the second measuring apparatus includes a second supporting structure to which the second sensing device and the calibration sensing device attach.

8. The system of claim 7, wherein the first supporting structure is rotatable relative to a first pivot axis, and the second supporting structure is rotatable relative to a second pivot axis.

9. The system of claim 8, wherein the means for repositioning the sensing field of the first sensing device includes a first lever attached to the first supporting structure for rotating the first supporting structure relative to the first pivot axis, and the means for repositioning the sensing field of the second sensing device includes a second lever attached to the second supporting structure for rotating the second supporting structure relative to the second pivot axis.

10. The system of claim 9, wherein the first sensing device and the calibration target move with the first supporting structure when the first supporting structure rotates relative to the first pivot axis; and the second sensing device and the calibration sensing device move with the second supporting structure when the second supporting structure rotates relative to the second pivot axis.

11. The system of claim 8, wherein the means for repositioning the sensing field of the first sensing device includes a first motor for rotating the first supporting structure relative to the first pivot axis, and the means for repositioning the sensing field of the second sensing device includes a second motor for rotating the second supporting structure relative to the second pivot axis.

12. A position determination system, comprising:
    a first measurement module, including
    a first measuring device for use with a first alignment target device to generate positional data of the first alignment target device relative to the first measuring device;
    a calibration target having a known positional relationship relative to the first measuring device; and
    means for reconfiguring the first measuring device such that the first alignment target device is within a specific measuring field of the first measuring device; and
    a second measurement module, including a second measuring device for use with a second alignment target device to generate positional data of the second alignment target device relative to the second measuring device;

a calibration measuring device for use with the calibration target to generate positional data of the calibration target relative to the calibration measuring device, wherein the positional relationship between the second measuring device and the calibration measuring device is known;

means for reconfiguring the second measuring device such that the second alignment target device is within a specific measuring field of the second measuring device; and a data processing system configured to couple to the first and second measuring devices to carry out the machine-implemented steps of:

determining whether the first alignment target is within a specific sensing field of the first measuring device by comparing data obtained by the first measuring device with prestored data representing the first alignment target being within the specific sensing field of the first measuring device; and determining whether the second alignment target is within a specific sensing field of the second measuring device by comparing data obtained by the second measuring device with prestored data representing the second alignment target being within the specific sensing field of the second measuring device.

13. The system of claim 12, wherein the first and second measuring devices are selected from a group consisting of:

an image-capturing device configured to capture images of alignment targets; and a detector for sensing a light beam from a light source disposed on alignment targets.

14. A method for calibrating a position determination system comprising: a first measuring apparatus and a second measuring apparatus, the first measuring apparatus including a first sensing device for obtaining positional data of a first testing target relative to the first sensing device; and a calibration target rigidly linked to the first sensing device, wherein the positional relationship between the first sensing device and the calibration target is known; the second measuring apparatus including a second sensing device for obtaining positional data of a second testing target relative to the second sensing device; and a calibration sensing device rigidly linked to the second sensing device for obtaining positional data of the calibration target relative to the calibration sensing device, wherein the positional relationship between the second sensing device and the calibration sensing device is known, the method comprising the machine-implemented steps of:

determining if the first testing target is within a specific sensing field of the first sensing device by comparing data sensed by the first sensing device with prestored data representing the first testing target being within the specific sensing field of the first sensing device, determining if the second testing target is within a specific sensing field of the second sensing device by comparing data sensed by the second sensing device with prestored data representing the second testing target being within the specific sensing field of the second sensing device;

responsive to the first testing target failing to be within the first specific sensing field of the first sensing device, repositioning the sensing field of the first sensing device until the first testing target is within the specific sensing field of the first sensing device;

responsive to the second testing target failing to be within the specific sensing field of the second sensing device, repositioning the sensing field of the second sensing device until the second testing target is within the specific sensing field of the second sensing device;

receiving signals representing positional data of the calibration target relative to the calibration sensing device; and determining a positional relationship of the first sensing device relative to the second sensing device based on the positional relationship between the first sensing device and the calibration target, the positional relationship between the second sensing device and the calibration sensing device, and the positional data of the calibration target relative to the calibration sensing device.

15. A machine-readable medium bearing instructions for controlling the operation of a position determination system that comprises a data processing system, a first measuring apparatus and a second measuring apparatus, both of which coupled to the data processing system, the first measuring apparatus including a first sensing device for obtaining positional data of a first testing target relative to the first sensing device; and a calibration target rigidly linked to the first sensing device, wherein the positional relationship between the first sensing device and the calibration target is known; the second measuring apparatus including: a second sensing device for obtaining positional data of a second testing target relative to the second sensing device; and a calibration sensing device rigidly linked to the second sensing device for obtaining positional data of the calibration target relative to the calibration sensing device, wherein the positional relationship between the second sensing device and the calibration sensing device is known, the machine-readable medium comprising instructions for controlling the position determination system to perform the machine-implemented steps of:

determining whether the first testing target is within a specific sensing field of the first sensing device by comparing data sensed by the first sensing device with prestored data representing the first testing target being within the specific sensing field of the first sensing device;

determining whether the second testing target is within a specific sensing field of the second sensing device by comparing data sensed by the second sensing device with prestored data representing the second testing target being within the specific sensing field of the second sensing device;

responsive to the first testing target failing to be within the specific sensing field of the first sensing device, repositioning the sensing field of the first sensing device; and responsive to the second testing target failing to be within the specific sensing field of the second sensing device, repositioning the sensing field of the second sensing device.

16. The machine-readable medium of claim 15 further comprising the machine-implemented step of:

receiving signals representing positional data of the calibration target relative to the calibration sensing device;

determining a positional relationship of the first sensing device relative to the second sensing device based on the positional relationship between the first sensing device and the calibration target, the positional relationship between the second sensing device and the calibration sensing device, and the positional data of the calibration target relative to the calibration sensing device.

17. The machine-readable medium of claim 16, further comprising the machine-implemented steps of:
   receiving signals representing positional data of the first testing target relative to the first sensing device;
   receiving signals representing positional data of the second testing target relative to the second sensing device;
   determining a positional parameter of the first testing target and a positional parameter of the second testing target based on the positional relationship between the first sensing device and the second sensing device, the positional relationship between the second sensing device and the calibration sensing device, the positional data of the first testing target relative to the first sensing device, the positional data of the second testing target relative to the second sensing device, and the positional data of the calibration target relative to the calibration sensing device.

18. A machine-readable medium bearing instructions for determining the operation mode of a position determination system that comprises a data processing system, a first sensing device for obtaining positional data of a first testing target relative to the first sensing device, and a second sensing device for obtaining positional data of a second testing target relative to the second sensing device, the first sensing device and the second sensing device coupled to the data processing system, the position determination system being configured to operate under either a first mode or a second mode, wherein, when operated under the first mode, the sensing field of the first sensing device is directed to a first point and the sensing field of the second sensing device is directed to a second point; and when operated under the second mode, the sensing field of the first sensing device is directed to a third point and the sensing field of the second sensing device is directed to a fourth point, the machine-readable medium comprising instructions for controlling the position determination system to perform the machine-implemented steps of:
   determining the position determination system being set to operate under the first mode;
   determining if the first testing target is within a specific sensing field of the first sensing device;
   determining if the second testing target is within a specific sensing field of the second sensing device; and
   responsive to the first testing target being outside the specific sensing field of the first sensing device and/or the second testing target is outside the specific sensing field of the second sensing device, determining that the position determination system should operate under the second mode.

19. The machine-readable medium of claim 18 further comprising the machine-implemented steps of
   responsive to a control signal, repositioning the sensing field of at least one of the first sensing device and the second sensing device such that the first testing target is within the specific sensing field of the first sensing device and the second testing target is within the specific sensing field of the second sensing device.

20. The machine-readable medium of claim 18, further comprising instructions to control the position determination system to perform the steps of:
   responsive to the first testing target being outside the specific sensing field of the first sensing device, repositioning the first sensing device to direct to the second third point corresponding to the second mode of the position determination system; and
   responsive to the second testing target being outside the specific sensing field of the second sensing device, repositioning the second sensing device to direct to the fourth point corresponding to the second mode of the position determination system.

21. A machine-readable medium bearing instructions for indicating the operation mode of a position determination system that comprises a data processing system, a first measuring apparatus and a second measuring apparatus, both of which coupled to the data processing system, the first measuring apparatus including a first sensing device for obtaining positional data of a first testing target relative to the first sensing device; and a calibration target rigidly linked to the first sensing device, wherein the positional relationship between the first sensing device and the calibration target is known; the second measuring apparatus including a second sensing device for obtaining positional data of a second testing target relative to the second sensing device; and a calibration sensing device rigidly linked to the second sensing device for obtaining positional data of the calibration target relative to the calibration sensing device, wherein the positional relationship between the second sensing device and the calibration sensing device is known, the machine-readable medium comprising instructions for controlling the position determination system to perform the machine-implemented steps of:
   determining whether the first testing target is within a specific sensing field of the first sensing device;
   determining whether the second testing target is within a specific sensing field of the second sensing device;
   responsive to the first testing target failing to be within the specific sensing field of the first sensing device, providing a first visual indication indicating that the first testing target fails to be within the specific sensing field; and
   responsive to the second testing target fails to be within the specific sensing field of the second sensing device, providing a second visual indication indicating that the second testing target fails to be within the specific sensing field.

22. A data processing system configured to operate with a position determining system that comprises a first measuring apparatus and a second measuring apparatus, both of which are configured to couple to the data processing system, the first measuring apparatus including a first sensing device for obtaining positional data of a first testing target relative to the first sensing device; and a calibration target rigidly linked to the first sensing device, wherein the positional relationship between the first sensing device and the calibration target is known; the second measuring apparatus including a second sensing device for obtaining positional data of a second testing target relative to the second sensing device; and a calibration sensing device rigidly linked to the second sensing device for obtaining positional data of the calibration target relative to the calibration sensing device, wherein the positional relationship between the second sensing device and the calibration sensing device is known, the data processing system comprising:
   a data processor;
   a data storage device;
   a display;
   a data path coupled to the data processor, the data storage device and the display;

wherein the data storage device bears instructions to cause the system upon execution of the instructions by the processor to perform the steps of:

determining whether the first testing target is within a specific sensing field of the first sensing device;

determining whether the second testing target is within a specific sensing field of the second sensing device;

responsive to the first testing target failing to be within the specific sensing field of the first sensing device, providing a first visual indication on the display indicating that the first testing target fails to be within the specific sensing field; and responsive to the second testing target failing to be within the specific sensing field of the second sensing device, providing a second visual indication on the display indicating that the second testing target fails to be within the specific sensing field.

23. A machine-readable medium bearing instructions for controlling the operation of a position determination system that comprises a data processing system, a first measuring module and a second measuring module, both of which are coupled to the data processing system, the first measuring module including a first measuring device for use with a first testing target to generate positional data of the first testing target relative to the first measuring device; and a calibration target having a known positional relationship between the first measuring device and the calibration target; the second measuring module including a second measuring device for use with a second testing target to generate positional data of the second testing target relative to the second measuring device; and a calibration measuring device attached to the second measuring device for use with the calibration target for generating positional data of the calibration target relative to the calibration measuring device, wherein the positional relationship between the second measuring device and the calibration measuring device is known, the machine-readable medium comprising instructions for controlling the position determination system to perform the machine-implemented steps of:

determining whether the first testing target is within a specific sensing field of the first measuring device by comparing data sensed by the first sensing device with prestored data representing the first testing target being within the specific sensing field of the first sensing device;

determining whether the second testing target is within a specific sensing field of the second measuring device by comparing data sensed by the second sensing device with prestored data representing the second testing target being within the specific sensing field of the second sensing device;

responsive to the first testing target failing to be within the specific sensing field of the first measuring device, continuously repositioning the sensing field of the first measuring device until the first testing target properly shows in the specific sensing field of the first measuring device; and responsive to the second testing target failing to be within the specific sensing field of the second sensing device, continuously repositioning the sensing field of the second measuring device until the second testing target properly show in the specific sensing field of the second measuring device.

24. A method for controlling the operation of a position determination system that comprises a data processing system, a first measuring apparatus and a second measuring apparatus, both of which coupled to the data processing system, the first measuring apparatus including a first sensing device for obtaining positional data of a first testing target relative to the first sensing device; and a calibration target rigidly linked to the first sensing device, wherein the positional relationship between the first sensing device and the calibration target is known; the second measuring apparatus including: a second sensing device for obtaining positional data of a second testing target relative to the second sensing device; and a calibration sensing device rigidly linked to the second sensing device for obtaining positional data of the calibration target relative to the calibration sensing device, wherein the positional relationship between the second sensing device and the calibration sensing device is known, the method comprising the machine-implemented steps of:

determining whether the first testing target is within a specific sensing field of the first sensing device by comparing data sensed by the first sensing device with prestored data representing the first testing target being within the specific sensing field of the first sensing device;

determining whether the second testing target is within a specific sensing field of the second sensing device by comparing data sensed by the second sensing device with prestored data representing the second testing target being within the specific sensing field of the second sensing device;

responsive to the first testing target failing to be within the specific sensing field of the first sensing device, repositioning the sensing field of the first sensing device; and responsive to the second testing target failing to be within the specific sensing field of the second sensing device, repositioning the sensing field of the second sensing device.

25. A method for determining the operation mode of a position determination system that comprises a data processing system, a first sensing device for obtaining positional data of a first testing target relative to the first sensing device, and a second sensing device for obtaining positional data of a second testing target relative to the second sensing device, the first sensing device and the second sensing device coupled to the data processing system, the position determination system being configured to operate under either a first mode or a second mode, wherein, when operated under the first mode, the sensing field of the first sensing device is directed to a first point and the sensing field of the second sensing device is directed to a second point; and when operated under the second mode, the sensing field if the first sensing device is directed to a third point and the sensing field of the second sensing device is directed to a fourth point, the method comprising the machine-implemented steps of:

determining the position determination system being set to operate under the first mode;

determining if the first testing target is within a specific sensing field of the first sensing device;

determining if the second testing target is within a specific sensing field of the second sensing device; and responsive to the first testing target being outside the specific sensing field of the first sensing device and/or the second testing target is outside the specific sensing field of the second sensing device, determining that the position determination system should operate under the second mode.

26. The method according to claim 25 further comprising the steps of:
- responsive to the first testing target being outside the specific sensing field of the first sensing device, repositioning the first sensing device to direct to the third point corresponding to the second mode of the position determination system; and
- responsive to the second testing target being outside the specific sensing field of the second sensing device, repositioning the second sensing device to direct to the fourth point corresponding to the second mode of the position determination system.

27. A method for indicating the operation mode of a position determination system that comprises a data processing system, a first measuring apparatus and a second measuring apparatus, both of which coupled to the data processing system, the first measuring apparatus including a first sensing device for obtaining positional data of a first testing target relative to the first sensing device; and a calibration target rigidly linked to the first sensing device, wherein the positional relationship between the first sensing device and the calibration target is known; the second measuring apparatus including a second sensing device for obtaining positional data of a second testing target relative to the second sensing device; and a calibration sensing device rigidly linked to the second sensing device for obtaining positional data of the calibration target relative to the calibration sensing device, wherein the positional relationship between the second sensing device and the calibration sensing device is known, the method comprising the machine-implemented steps of:
- determining whether the first testing target is within a specific sensing field of the first sensing device;
- determining whether the second testing target is within a specific sensing field of the second sensing device;
- responsive to the first testing target failing to be within the specific sensing field of the first sensing device, providing a first visual indication indicating that the first testing target fails to be within the specific sensing field; and
- responsive to the second testing target fails to be within the specific sensing field of the second sensing device, providing a second visual indication indicating that the second testing target fails to be within the specific sensing field.

28. A method for controlling the operation of a position determination system that comprises a data processing system, a first measuring module and a second measuring module, both of which are coupled to the data processing system, the first measuring module including a first measuring device for use with a first testing target to generate positional data of the first testing target relative to the first measuring device; and a calibration target having a known positional relationship between the first measuring device and the calibration target; the second measuring module including a second measuring device for use with a second testing target to generate positional data of the second testing target relative to the second measuring device; and a calibration measuring device attached to the second measuring device for use with the calibration target for generating positional data of the calibration target relative to the calibration measuring device, wherein the positional relationship between the second measuring device and the calibration measuring device is known, the method comprising the machine-implemented steps of:
- determining whether the first testing target is within a specific sensing field of the first measuring device by comparing data captured by the first measuring device with prestored data representing the first testing target being within the specific sensing field of the first measuring device;
- determining whether the second testing target is within a specific sensing field of the second measuring device by comparing data captured by the second measuring device with prestored data representing the second testing target being within the specific sensing field of the second measuring device;
- responsive to the first testing target failing to be within the specific sensing field of the first measuring device, continuously repositioning the sensing field of the first measuring device until the first testing target properly shows in the specific sensing field of the first measuring device; and
- responsive to the second testing target failing to be within the specific sensing field of the second sensing device, continuously repositioning the sensing field of the second measuring device until the second testing target properly show in the specific sensing field of the second measuring device.

29. A data processing system that controls the operation of a position determination system that comprises a first sensing device for obtaining positional data of a first testing target relative to the first sensing device, and a second sensing device for obtaining positional data of a second testing target relative to the second sensing device, the first sensing device and the second sensing device coupled to the data processing system, the position determination system being configured to operate under either a first mode or a second mode, wherein, when operated under the first mode, the sensing field of the first sensing device is directed to a first point and the sensing field of the second sensing device is directed to a second point; and when operated under the second mode, the sensing field of the first sensing device is directed to a third point and the sensing field of the second sensing device is directed to a fourth point, the data processing system comprising:
- a data processor;
- a data storage device;
- a display; and
- a data path coupled to the data processor, the data storage device and the display;
- wherein the data storage device bears instructions to cause the system upon execution of the instructions by the processor to perform the steps of:
- determining the position determination system being set to operate under the first mode;
- determining whether the first testing target is within a specific sensing field of the first sensing device;
- determining whether the second testing target is within a specific sensing field of the second sensing device; and
- responsive to the first testing target being outside the specific sensing field of the first sensing device or the second testing target being outside the specific sensing field of the second sensing device, determining that the position determination system should operate under the second mode.

30. The data processing system of claim 29, wherein the data storage device further bears instructions to control the data processing system to perform the steps of:
- responsive to the first testing target being outside the specific sensing field of the first sensing device, controlling to reposition the first sensing device to direct to the third point corresponding to the second mode of the position determination system; and responsive to the second testing target being outside the specific sensing field of the second sensing device, controlling to reposition the second sensing device to direct to the fourth point corresponding to the second mode of the position determination system.

31. A position determination system comprising:

a first measuring apparatus, including:
- a first sensing means having a sensing field for obtaining positional data of a first testing target means relative to the first sensing means;
- a calibration target means rigidly linked to the first sensing means, wherein the positional relationship between the first sensing means and the calibration target is known; and
- means for repositioning the sensing field of the first sensing means without altering the positional relationship between the first sensing means and the calibration target means;

a second measuring apparatus, including:
- a second sensing means having a sensing field for obtaining positional data of a second testing target means relative to the second sensing means;
- a calibration sensing means rigidly linked to the second sensing means for obtaining positional data of the calibration target means relative to the calibration sensing means, wherein the positional relationship between the second sensing means and the calibration sensing means is known;
- means for repositioning the sensing field of the second sensing means without altering the positional relationship between the second sensing means and the calibration sensing means; and and a data processing system configured to couple to the first sensing means and the second sensing means to carry out the machine-implemented steps of:
- determining whether the first testing target means is within a specific sensing field of the first sensing means by comparing data sensed by the first sensing means with prestored data representing the first testing target means being within the specific sensing field of the first sensing means; and
- determining whether the second testing target is within a specific sensing field of the second sensing means by comparing data sensed by the second sensing means with prestored data representing the second testing target means being within the specific sensing field of the second sensing means.

32. A position determination system configured to operate under a first mode or a second mode, the position determination system comprising:

a first sensing device for obtaining positional data of a first testing target relative to the first sensing device, wherein the first sensing device is configured to direct to a first point when the position determination system is operated under the first mode, and to a third point when the position determination system is operated under the second mode;

a second sensing device for obtaining positional data of a second testing target relative to the second sensing device, wherein the second sensing device is configured to direct to a second point when the position determination system is operated under the first mode, and to a fourth point when the position determination system is operated under the second mode; and a data processing system coupled to the first sensing device and the second sensing device, and configured to perform the steps of:

determining the position determination system being set to operate under the first mode;

determining whether the first testing target is within a specific sensing field of the first sensing device;

determining whether the second testing target is within a specific sensing field of the second sensing device; and responsive to the position determination system being set to operate under the first mode, and the first testing target being outside the specific sensing field of the first sensing device or the second testing target being outside the specific sensing field of the second sensing device, determining that the position determination system should operate under the second mode.

33. The position determination system of claim 32, wherein the data processing system is further configured to perform the steps of:

responsive to the first testing target being outside the specific sensing field of the first sensing device, controlling to reposition the first sensing device to direct to the third point corresponding to the second mode of the position determination system; and responsive to the second testing target being outside the specific sensing field of the second sensing device, controlling to reposition the second sensing device to direct to the fourth point corresponding to the second mode of the position determination system.

* * * * *